US011657821B2

(12) United States Patent
Nagata

(10) Patent No.: US 11,657,821 B2
(45) Date of Patent: May 23, 2023

(54) INFORMATION PROCESSING APPARATUS, INFORMATION PROCESSING SYSTEM, AND INFORMATION PROCESSING METHOD TO EXECUTE VOICE RESPONSE CORRESPONDING TO A SITUATION OF A USER

(71) Applicant: SONY CORPORATION, Tokyo (JP)

(72) Inventor: Masaharu Nagata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 137 days.

(21) Appl. No.: 17/250,386

(22) PCT Filed: Jun. 3, 2019

(86) PCT No.: PCT/JP2019/021913
§ 371 (c)(1),
(2) Date: Jan. 14, 2021

(87) PCT Pub. No.: WO2020/021861
PCT Pub. Date: Jan. 30, 2020

(65) Prior Publication Data
US 2021/0264915 A1 Aug. 26, 2021

(30) Foreign Application Priority Data
Jul. 26, 2018 (JP) .............................. JP2018-140187

(51) Int. Cl.
*G10L 15/22* (2006.01)
*G06T 7/70* (2017.01)
(Continued)

(52) U.S. Cl.
CPC ................ *G10L 15/22* (2013.01); *G06T 7/70* (2017.01); *G10L 15/24* (2013.01); *H04R 1/406* (2013.01);
(Continued)

(58) Field of Classification Search
CPC ......... G10L 15/22; G10L 15/24; G10L 25/51; G10L 13/02; G10L 21/034;
(Continued)

(56) References Cited

U.S. PATENT DOCUMENTS

2015/0331490 A1* 11/2015 Yamada .................. G06F 3/017
345/156
2017/0186428 A1* 6/2017 Kunitake ................ G10L 17/06

FOREIGN PATENT DOCUMENTS

JP 2005-107384 A 4/2005
JP 2014-153663 A 8/2014
(Continued)

OTHER PUBLICATIONS

International Search Report and Written Opinion of PCT Application No. PCT/JP2019/021913, dated Jun. 8, 2019, 08 pages of ISRWO.

*Primary Examiner* — Yogeshkumar Patel
(74) *Attorney, Agent, or Firm* — Chip Law Group

(57) ABSTRACT

There are included: a detection unit that detects a positional relationship between a user and an object on the basis of an image captured by a camera; a determination unit that determines a situation of the user on the basis of the positional relationship between the user and the object detected by the detection unit; and a response control unit that executes a voice response corresponding to the situation of the user determined by the determination unit.

17 Claims, 18 Drawing Sheets

(51) Int. Cl.
    *G10L 15/24*    (2013.01)
    *H04R 1/40*     (2006.01)
    *H04R 3/00*     (2006.01)

(52) U.S. Cl.
    CPC .... *H04R 3/005* (2013.01); *G06T 2207/30196* (2013.01)

(58) Field of Classification Search
    CPC .... G10L 2015/088; G06F 3/011; G06F 3/167; G06F 3/005; G06F 2203/011; H04R 1/406; H04R 3/005; G06T 7/70; G06T 7/62; G06T 2207/30196; H04S 7/303
    See application file for complete search history.

(56)                References Cited

FOREIGN PATENT DOCUMENTS

JP      2017-117371  A         6/2017
    JP      2018-045192  A         3/2018
    JP       2018045192  A    *    3/2018
    WO      2014/125791  A1        8/2014

* cited by examiner

INFORMATION PROCESSING APPARATUS, INFORMATION PROCESSING SYSTEM, AND INFORMATION PROCESSING METHOD TO EXECUTE VOICE RESPONSE CORRESPONDING TO A SITUATION OF A USER

CROSS REFERENCE TO RELATED APPLICATIONS

This application is a U.S. National Phase of International Patent Application No. PCT/JP2019/021913 filed on Jun. 3, 2019, which claims priority benefit of Japanese Patent Application No. JP 2018-140187 filed in the Japan Patent Office on Jul. 26, 2018. Each of the above-referenced applications is hereby incorporated herein by reference in its entirety.

TECHNICAL FIELD

The present disclosure relates to an information processing apparatus, an information processing system, an information processing method, and an information processing program.

BACKGROUND ART

Currently, there are increasing opportunities for various information processing apparatuses to be used in daily life and business. For example, there is a case where a plurality of various information processing apparatuses is installed even in a house. As one of such information processing apparatuses, a smart speaker or the like that recognizes a user's utterance by voice and makes a response by voice is known. Patent Document 1 discloses a voice recognition apparatus with an image recognition function added to a device that uses voice recognition to produce little false recognition.

CITATION LIST

Patent Document

Patent Document 1: Japanese Patent Application Laid-Open No. 2005-107384

SUMMARY OF THE INVENTION

Problems to be Solved by the Invention

In such a field, it is desired to establish communication properly between the various information processing apparatuses and a user.

An object of the present disclosure is to provide an information processing apparatus, an information processing system, an information processing method, and an information processing program that realize smooth communication between the information processing apparatus and a user.

Solutions to Problems

The present disclosure is, for example,
an information processing apparatus including:
a detection unit that detects a positional relationship between a user and an object on the basis of an image captured by a camera;
a determination unit that determines a situation of the user on the basis of the positional relationship between the user and the object detected by the detection unit; and
a response control unit that executes a voice response corresponding to the situation of the user determined by the determination unit.

The present disclosure is, for example,
an information processing system including:
a detection unit that detects a positional relationship between a user and an object on the basis of an image captured by a camera;
a determination unit that determines a situation of the user on the basis of the positional relationship between the user and the object detected by the detection unit; and
a response control unit that executes a voice response corresponding to the situation of the user determined by the determination unit.

The present disclosure is, for example,
an information processing method including:
detecting a positional relationship between a user and an object on the basis of an image captured by a camera;
determining a situation of the user on the basis of the positional relationship between the user and the object detected; and
executing a voice response corresponding to the situation of the user determined.

The present disclosure is, for example,
an information processing program that causes an information processing apparatus to execute:
detection processing that detects a positional relationship between a user and an object on the basis of an image captured by a camera;
determination processing that determines a situation of the user on the basis of the positional relationship between the user and the object detected by the detection processing; and
response control processing that executes a voice response corresponding to the situation of the user determined by the determination processing.

Effects of the Invention

According to at least one embodiment of the present disclosure, the situation of the user is detected, and the voice response corresponding to the situation detected is made. Therefore, a proper voice response can be made to the user. Effects of the present disclosure are not limited to the effect described herein, and may include any effect described in the present disclosure. Moreover, the content of the present disclosure is not construed as being limited by the illustrated effects.

MODES FOR CARRYING OUT THE INVENTION

Embodiments and the like of the present disclosure will now be described with reference to the drawings. Note that the description will be made in the following order.

<1. First embodiment>
<2. Second embodiment>
<3. Third embodiment>
<4. Fourth embodiment>
<5. Fifth embodiment>
<6. Sixth embodiment>
<7. Seventh embodiment>
<8. Eighth embodiment>

The embodiments and the like described below are preferred specific examples of the present disclosure, and the content of the present disclosure is not limited to these embodiments.

1. First Embodiment

Figure 1:
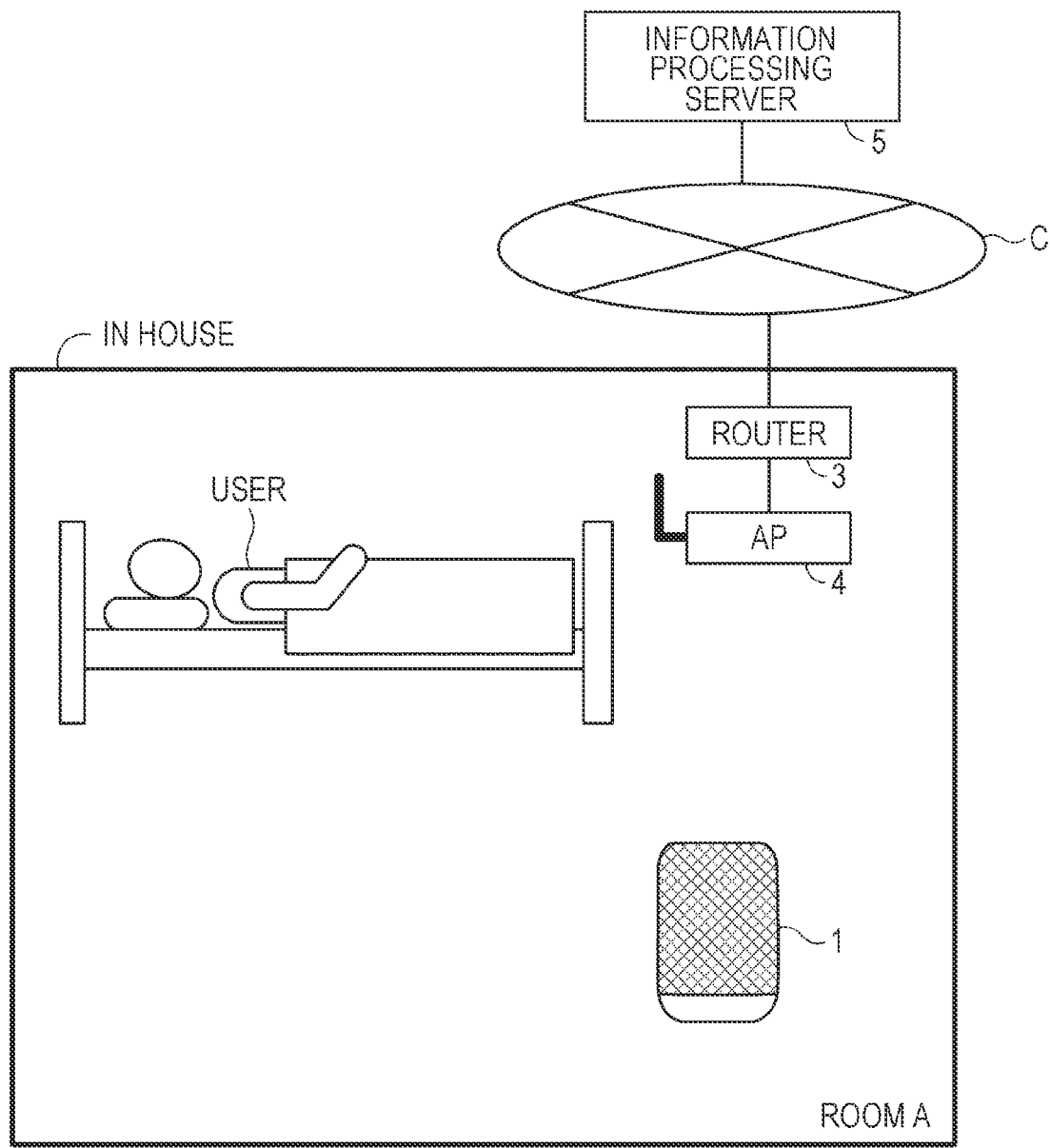
FIG. 1 is a diagram for explaining a use situation of an information processing system according to a first embodiment.

FIG. 1 is a diagram for explaining a use situation of an information processing system according to an embodiment. Currently, there is an information processing apparatus 1 called a smart speaker, an artificial intelligence (AI) speaker, or the like that can respond by voice to a user's voice speaking thereto, a user's operation, or the like. The present embodiment assumes a case where the information processing apparatus 1 such as the smart speaker is installed in a house (in room A). Note that the information processing apparatus 1 can apply not only to such a smart speaker but also to various apparatuses such as a television, a robot, and a personal computer. Moreover, the information processing apparatus 1 can be arranged in various modes such as a mode of being embedded in a wall surface in addition to a mode of being placed on a table top, a floor, or the like.

In FIG. 1, communication equipment that can be connected to a communication network C such as the Internet is provided in the house. As the communication equipment, a router 3 connected to the communication network C and an access point 4 connected to the router 3 are provided. The smart speaker as the information processing apparatus 1 can communicate with an information processing server 5 or the like connected to the communication network C by performing wireless communication with the access point 4.

Figure 2:
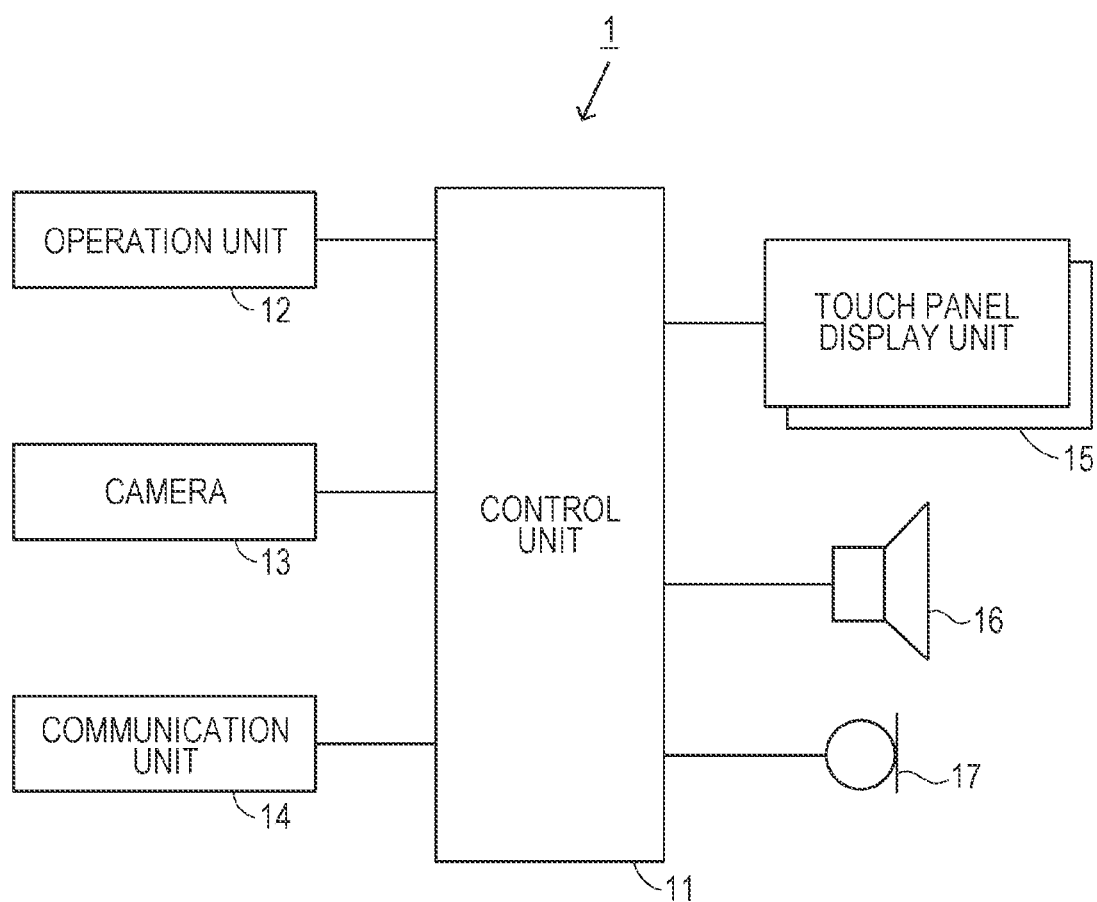
FIG. 2 is a block diagram illustrating a configuration of an information processing apparatus according to the first embodiment.

FIG. 2 is a block diagram illustrating a configuration of the information processing apparatus 1 according to the embodiment. The information processing apparatus 1 of the present embodiment adopts a mode as the so-called smart speaker that can respond by voice to a user's response or operation. The information processing apparatus 1 of the present embodiment includes a control unit 11, an operation unit 12, a camera 13, a communication unit 14, a touch panel display unit 15, a speaker 16, and a microphone 17.

The control unit 11 includes a CPU capable of executing various programs, a ROM and a RAM for storing various programs and data, and the like, and is a part that controls the information processing apparatus 1 in an integrated manner. The operation unit 12 is a part such as a power button or a volume button that receives an operation from a user. The camera 13 is arranged to be able to image the periphery of the information processing apparatus 1. Note that one or a plurality of the cameras 13 may be provided. The one or the plurality of the cameras 13 preferably has an imaging range of 360 degrees around the information processing apparatus 1 so as to be able to image a situation in the house no matter where the information processing apparatus 1 is arranged in the house.

The communication unit 14 is a part that communicates with various external apparatuses, and is in a mode of using a Wi-Fi standard in the present embodiment as the communication unit 14 communicates with the access point 4. In addition, the communication unit 14 may use short-range communication means by Bluetooth (registered trademark), infrared communication, or the like, or mobile communication means that can be connected to the communication network C via a mobile communication network instead of the access point 4.

The touch panel display unit 15 is a user interface in which a display unit and a touch panel using a pressure sensitive method, a capacitive sensing method, or the like are superimposed to be able to perform various displays on the display unit, the display unit using liquid crystal, organic electro luminescence (EL), or a projector or the like that projects a picture on a wall surface, a screen, or the like. The touch panel display unit can also accept various inputs from a user by touch input of various objects displayed on the display unit. Note that the information processing apparatus 1 can also have a configuration in which the touch panel display unit 15 is not provided, or a configuration in which only the display unit is provided. The speaker 16 can give a notification by sound to a user. The microphone 17 can capture sound around the information processing apparatus 1.

The information processing apparatus 1 such as the smart speaker described with reference to FIGS. 1 and 2 executes response processing that performs response control by voice on the condition of a user speaking to the apparatus, a user performing an operation, or a certain condition being satisfied. By such response processing, the user can obtain necessary information by voice. The response processing by the information processing apparatus 1 as described above is not performed in consideration of a situation of the user including an action or state of the user such as a sleeping situation, a relaxing situation, a situation of watching television, or a situation of having a conversation with a family member, so that response control inappropriate for the situation of the user has been performed in some cases.

For example, in a case where the user talks in the situation where he is sleeping, the information processing apparatus 1 possibly determines that the sleep talking of the user is a voice speaking to the apparatus, that is, a command to the information processing apparatus 1, and responds to the sleep talking. In such a case, the response control by voice of the information processing apparatus 1 can disturb the sleep of the user. Moreover, in the situation where the user is relaxing on a sofa, in a case where the information processing apparatus 1 performs response control by voice in a uniform manner as with the response processing in another situation, the response control can disturb the relaxing situation. One object of the present embodiment is for the information processing apparatus 1, which responds by voice to the user, to perform response control matching the situation of the user by determining the situation of the user and performing the response control corresponding to the situation.

Figure 3:
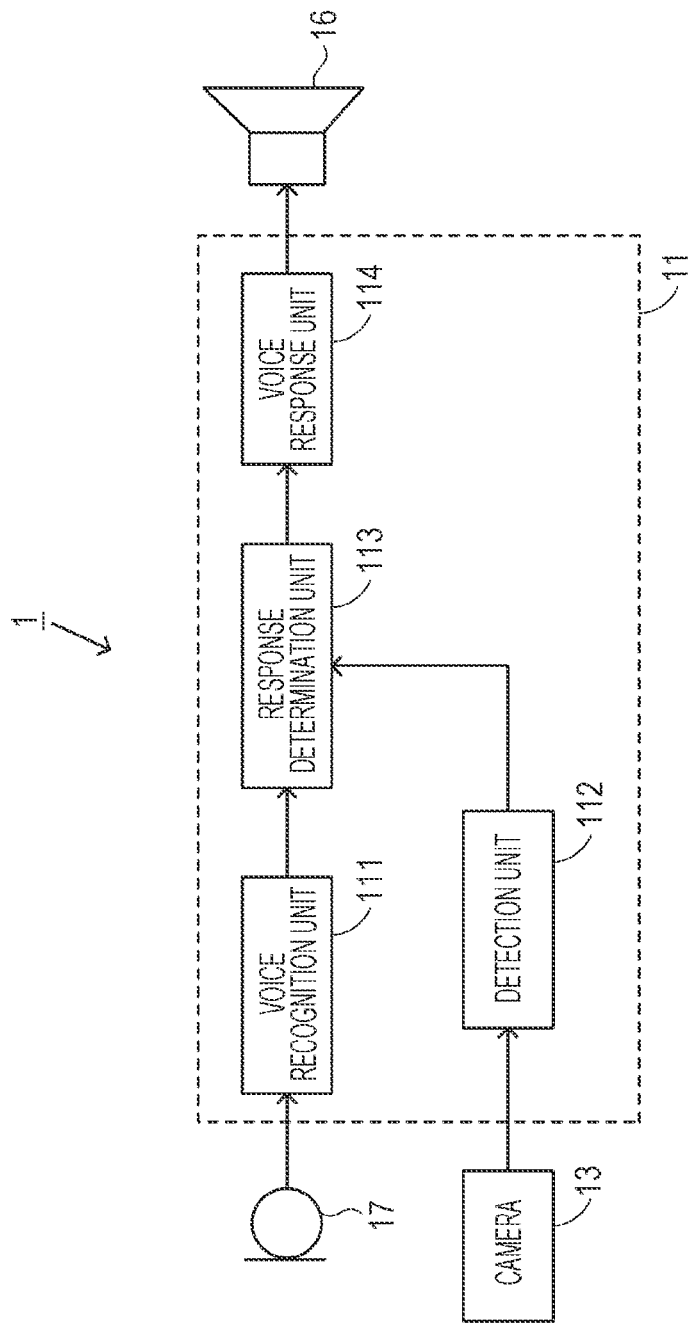
FIG. 3 is a block diagram illustrating a control configuration of the information processing apparatus according to the first embodiment.

FIG. 3 is a block diagram illustrating a control configuration of the information processing apparatus 1 according to the first embodiment. FIG. 3 is a diagram for explaining the control configuration in the control unit 11 of FIG. 2. The control unit 11 includes a voice recognition unit 111, a detection unit 112, a response determination unit 113, and a voice response unit 114. Note that these units in the control unit 11 are typically implemented by software, but may be partially or entirely implemented by hardware.

A voice collected by the microphone 17 is recognized by the voice recognition unit 111. Any known suitable method need only be selected as the voice recognition technique. For example, the voice collected can be recognized by breaking down the input voice into phonemes, which are the smallest units of sound, comparing the phonemes with phonemes recorded in advance to identify the phonemes, and combining the phonemes. Furthermore, the voice recognition by the voice recognition unit 111 may be performed not only in the information processing apparatus 1 but also in coordination with the information processing server 5 connected to and communicating with the information processing apparatus 1.

An image captured by the camera 13 is transmitted to the detection unit 112. Note that the image captured by the camera 13 may be either a still image or a moving image. The detection unit 112 detects a user (person) and also an object such as furniture, a home appliance, or a room structure on the basis of the image captured. The technique for detecting physical objects such as the user and the object can be implemented by any known suitable method. In recent years, research on general object detection algorithms by deep learning has been in progress, and a method for detecting physical objects with high accuracy has been developed such as You Only Look One (YOLO) published in Computer Vision and Pattern Recognition (CVPR) in 2016, for example. The detection unit 112 can adopt such various methods.

A learning method for detecting the user (person) and the object uses, for example, a neural network or deep learning. The neural network is a model that imitates a neural circuit of a human brain and includes three types of layers, an input layer, an intermediate layer (hidden layer), and an output layer. Moreover, the deep learning is a model using the neural network having a multi-layer structure, and can learn a complicated pattern hidden in a large amount of data by repeating characteristic learning in each layer. The deep learning is used, for example, to identify an object in an image or a word in a voice.

Moreover, as a hardware structure for implementing such machine learning, a neurochip or neuromorphic chip incorporating the concept of the neural network can be used.

Furthermore, problem setting in the machine learning includes supervised learning, unsupervised learning, semi-supervised learning, reinforcement learning, inverse reinforcement learning, active learning, transfer learning, and the like. For example, in the supervised learning, features are learned on the basis of given labeled training data (labeled data). This makes it possible to derive labels for unknown data.

Moreover, in the unsupervised learning, features are extracted by analyzing a large amount of unlabeled training data, and clustering is performed on the basis of the features extracted. This makes it possible to analyze trends and predict the future on the basis of an enormous amount of unknown data.

Moreover, the semi-supervised learning is a mixture of the supervised learning and the unsupervised learning and is a method in which features are learned in the supervised learning, and then an enormous amount of training data is given in the unsupervised learning so that learning is repeated while causing features to be calculated automatically.

Moreover, the reinforcement learning deals with a problem in which an agent in a certain environment observes a current state and determines an action to take. The agent acquires a reward from the environment by selecting the action and learns how to obtain the most rewards through a series of actions. Learning the optimum solution in a certain environment in such a way can reproduce decision making of a human and can cause a computer to acquire decision making that exceeds that of a human.

By the machine learning as described above, the information processing apparatus 1 can detect the user (person) and various objects on the basis of the image captured by the camera 13. It is also possible to use the machine learning to determine a situation of the user (including an action and a state of the user) on the basis of a positional relationship between the user and the object, as described later.

The response determination unit 113 determines what kind of situation the user is in on the basis of the positional relationship between the user and the object detected by the detection unit 112, and causes the voice response unit 114 to execute response control corresponding to the situation. Note that the response control corresponding to the situation can include, for example, a change in the content of a response, the volume of a response voice, the speed of voice, the sound quality of voice, or the type of voice (for example, the type of a person who utters the voice such as male voice or female voice). Note that the response control corresponding to the situation also includes whether or not to make a voice response, that is, making a voice response or not making a voice response.

The voice response unit 114 generates voice generating data corresponding to the situation of the user according to the determination by the response determination unit 113. The voice generating data is generated by, for example, using Text To Speech (TTS) technology to synthesize text into voice and convert it into waveform data. Note that the voice generating data may be generated in response to the voice input from the microphone 17, or may be generated by an autonomous determination of the information processing apparatus 1. The voice generating data generated by the voice response unit 114 is emitted to the outside from the speaker 16.

Figure 4:
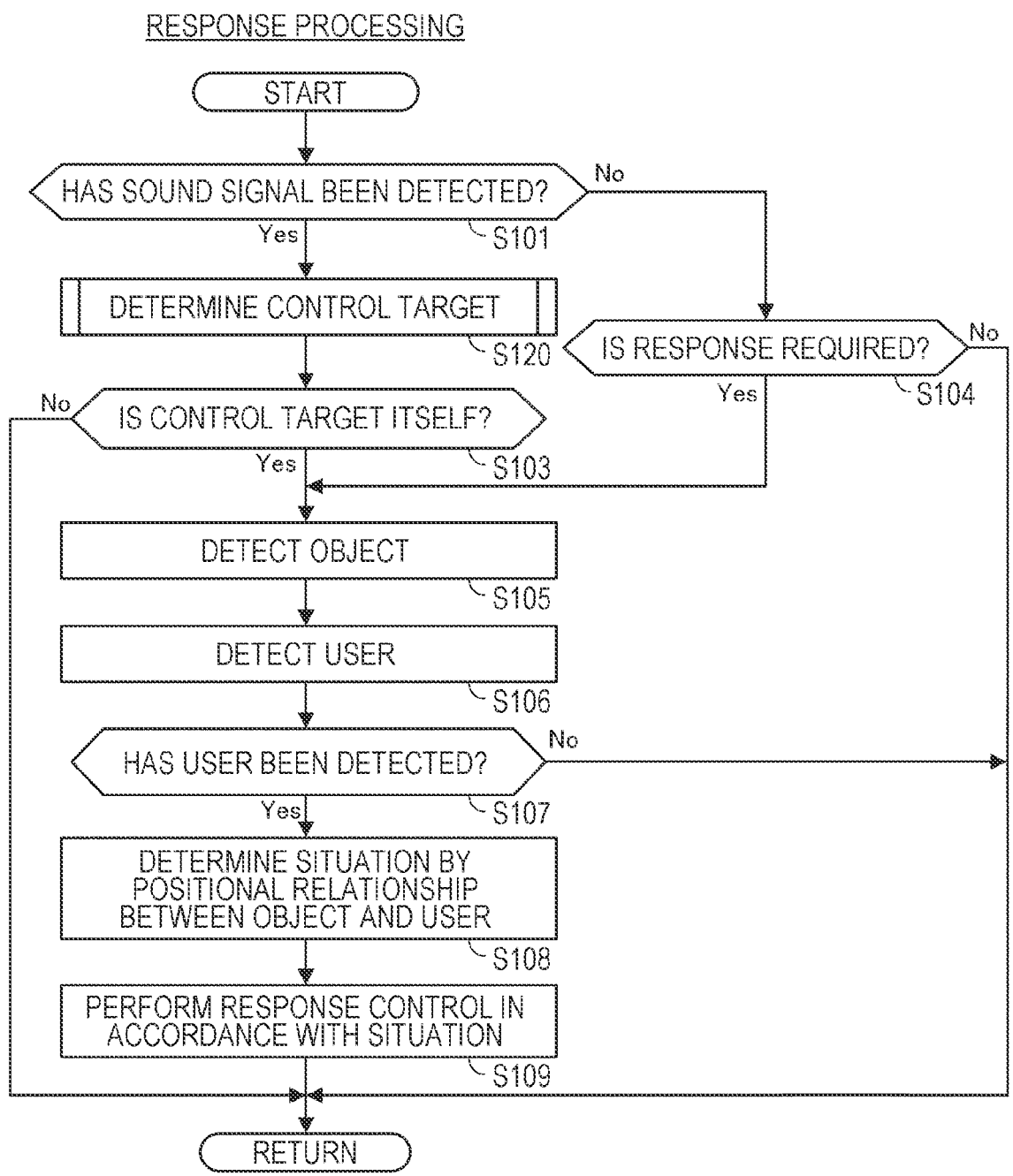
FIG. 4 is a flowchart illustrating response processing of the information processing apparatus according to the first embodiment.

FIG. 4 is a flowchart illustrating the response processing executed by the information processing apparatus 1 according to the first embodiment. The response processing is processing that is executed during a period in which the information processing apparatus 1 is activated, and is processing that performs response control by voice in response to an utterance by a user or autonomously performs response control by voice with a condition being satisfied even without an utterance by a user.

Once the response processing is started, the information processing apparatus 1 detects a sound signal such as an utterance by a user (Yes in S101) or monitors whether an autonomous response is required (S104). Here, the autonomous response is required in a case where a response by the information processing apparatus 1 is required even when there is no utterance by a user and where a condition for making a response other than detecting an utterance by a user is satisfied, the condition including, for example, detection of an operation by a user, arrival of a predetermined time, satisfaction of a predetermined condition in a surrounding environment, or the like.

In the case where the information processing apparatus 1 has detected the sound signal such as the utterance by the user (Yes in S101), the information processing apparatus 1 determines a control target of the utterance on the basis of the utterance detected (S120). For example, in the smart speaker, a target of the utterance is defined by adding a name given to the smart speaker before a command. In a case where the target of the utterance specifies itself, that is, specifies the information processing apparatus 1 (Yes in S103), the information processing apparatus 1 executes processing for performing response control by voice (S105 to S109). On the other hand, in a case where the target of the utterance is not the information processing apparatus 1 (No in S103), the information processing apparatus temporarily exits the response processing and returns to monitoring an utterance by a user (S101) and monitoring whether an autonomous response is required (S104).

In the processing for performing the response control by voice (S105 to S109), the information processing apparatus 1 analyzes a picture acquired by the camera 13 using the detection unit 112 to detect an object such as furniture, a home appliance, or a room structure (S105). Then, the detection unit 112 analyzes the picture acquired by the camera 13 to detect a user (person) (S106). In a case where a user has not been detected in the picture acquired by the camera 13 (No in S107), the information processing apparatus exits the response processing because the response control by voice does not need to be executed. On the other hand, in a case where a user has been detected in the picture acquired by the camera 13 (Yes in S107), it is determined what kind of situation the user is in on the basis of a positional relationship between the user detected in S106 and the object detected in S105. Note that in the present embodiment, the user detection (S107) is performed using the picture acquired by the camera 13, but the user detection may be performed using a sensor provided separately from the camera 13. In that case, on condition that the user has been detected using the sensor (Yes in S107), the processing proceeds to the processing that determines the situation of the user (S108) using the picture acquired by the camera 13. Note that at that time, in a case where the user is not shown in the picture acquired by the camera 13, it is preferable to perform processing such as waiting until the user is shown in the picture.

For example, in the situation where the user is lying on a bed as illustrated in FIG. 1, it is determined that the user is lying on the bed, that is, the user is sleeping, on the basis of a positional relationship between the bed detected as the object and the user. In addition to this, various modes illustrated in Table 1 below are conceivable as the situation of the user to be determined and the response control therefor. In Table 1, the positional relationship, the situation of the user, and the content of the response control are associated with one another, the positional relationship being the positional relationship between the user and the object, the situation of the user being the user's situation such as an action or state of the user determined using the positional relationship, and the content of the response control being the content of the response control executed on the basis of the situation of the user.

TABLE 1

| POSITIONAL RELATIONSHIP | SITUATION OF USER | CONTENT OF RESPONSE CONTROL |
|---|---|---|
| USER IS NEAR TELEPHONE | USER IS IN CALL | INHIBIT RESPONSE |
| USER IS NEAR PC, SMARTPHONE, TABLET, OR THE LIKE | USER IS CONCENTRATING ON OPERATION | INHIBIT RESPONSE |
| MULTIPLE USERS ARE NEAR DINING TABLE | MULTIPLE USERS ARE HAVING MEAL | SET TO RESPONSE CONTENT SUITABLE FOR DURING MEAL |
| USER IS NEAR KITCHEN | USER IS COOKING | SET TO RESPONSE CONTENT SUITABLE FOR COOKING |
| USER IS NEAR BOOK | USER IS READING | INHIBIT RESPONSE |
| USER IS LYING ON SOFA | USER IS SLEEPING | INHIBIT RESPONSE |
| USER IS ON SOFA FACING DIRECTION OF TV | USER IS WATCHING TV OR MOVIE | INHIBIT RESPONSE |
| USER IS NEAR DESK | USER IS STUDYING | CONTROL VOLUME OF RESPONSE OR SET TO RESPONSE CONTENT SUITABLE FOR STUDYING |
| USER IS NEAR MUSICAL INSTRUMENT | USER IS PLAYING | INHIBIT RESPONSE OR SET RESPONSE CONTENT TO TOPIC RELATED TO MUSIC |

Note that in order to more accurately determine the situation of the user, it is preferable to use a positional relationship between a body part of the user and the object as the positional relationship between the user and the object. For example, in a case where a telephone is positioned near the head of the user, it can be determined that a call is in progress. Moreover, it can be determined that the user is sleeping in a case where the back of the user is in contact with the bed, or it can be determined that the user is in a relaxed situation in a case where the back of the user is not in contact with the bed.

As described above, the situation of the user can be determined on the basis of the positional relationship between the object detected in S105 and the user detected in S106. Note that in the present embodiment, the object detection (S105) and the user detection (S106) are executed in the case where the sound signal has been detected (Yes in S101) or where it has been determined that the autonomous response is required (Yes in S104), but these processings may be performed at all times in the information processing apparatus 1. Furthermore, since the information processing apparatus 1 is often used in a predetermined place, the object detection (S105) may be performed not on the entire area of the picture acquired by the camera 13 but only on a part that has changed (i.e., a difference).

After the situation of the user has been determined in S108, the response determination unit 113 executes response control on the basis of the content of the utterance by the user and the situation of the user determined (S109). For example, in a case where it has been determined that the user is relaxing on a sofa, the voice generating data with female voice, rather low volume, and slow voice speed is generated. By emitting such voice generating data from the speaker 16, necessary information can be transmitted by voice without disturbing the atmosphere around the user relaxing on the sofa. Moreover, in the situation where the user is sleeping as illustrated in FIG. 1, it is possible that the information processing apparatus 1 has interpreted sleep talking of the user as a command. In such a case, it is possible to avoid disturbing the sleep of the user by not generating the voice generating data, that is, not responding. As described above, the present embodiment determines the situation of the user according to the positional relationship between the object and the user, thereby being to perform the response control by voice corresponding to the situation of the user.

Note that when the response control corresponding to the situation of the user is executed, the touch panel display unit 15 as the display unit may display the situation of the user determined. For example, in a case where the user is at a desk, it is possible to determine that the user is studying and not make a response. In that case, the touch panel display unit 15 may display the reason for not making a response, that is, the fact that the user is studying, to provide visual notification of the reason why no response has been made. Such visual notification using the display unit may be executed not only in the case where no response is made but also in a case where a response is made. Moreover, the touch panel display unit 15 as the display unit may display various information such as a fact that a response is in progress, a situation of the room, or a situation of the user in addition to the reason for not making a response as described above.

On the other hand, in the case where an autonomous response by the information processing apparatus 1 is required (Yes in S104), the processings for performing response control by voice (S105 to S109) are similarly executed. In this case, since there is no voice spoken to the apparatus by the user's intention, the response control by voice may be performed in consideration of not only the situation of the user but also the content of the response. For example, in the case where it is determined that the user is sleeping as illustrated in FIG. 1, the response may be made for the purpose of waking up the user who is sleeping by making the response with a louder voice than at the time of a normal response in a case where a voice implying urgency such as an alarm sound for waking up or an alarm due to the occurrence of an earthquake needs to be output.

As the response processing by the information processing apparatus 1 regarding the first embodiment has been described above, the present embodiment determines the situation of the user according to the positional relationship between the object and the user, thereby being to perform the response control by voice corresponding to the situation of the user.

2. Second Embodiment

Figure 5:
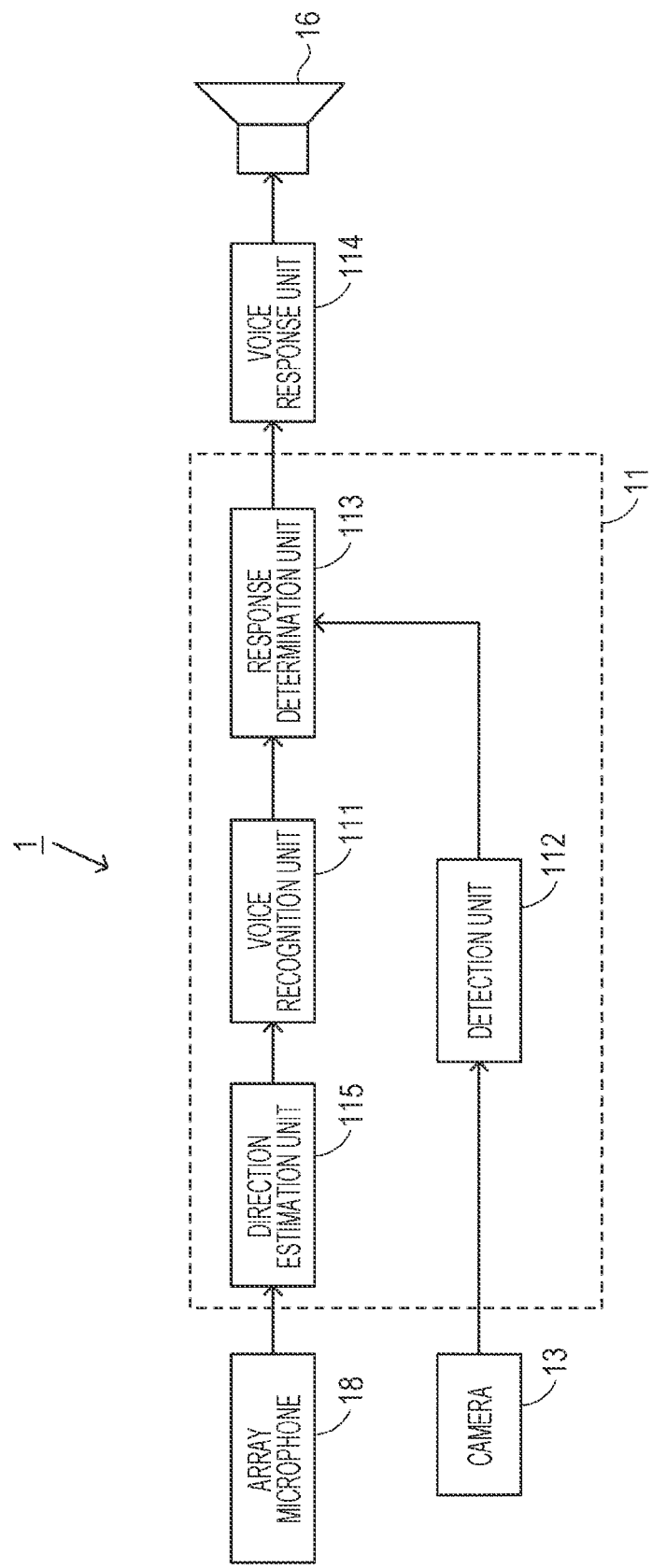
FIG. 5 is a block diagram illustrating a configuration of an information processing apparatus according to a second embodiment.

FIG. 5 is a block diagram illustrating a configuration of an information processing apparatus according to a second embodiment. In FIG. 5, those having the same functions as the ones described in the first embodiment (FIG. 3) are assigned the same reference numerals as those in FIG. 3, and the description thereof will be omitted.

The first embodiment uses the microphone 17, whereas the second embodiment is different therefrom in that an array microphone 18 is used. The array microphone 18 has a configuration in which a plurality of microphones is arrayed appropriately. Therefore, a sound emitted from a certain point arrives at the microphones with different delay times. These delay times are used to be able to estimate a direction from which the sound is emitted. A direction estimation unit 115 performs signal processing on the sound from the plurality of microphones of the array microphone 18, and estimates the direction from which the sound is generated. Since the direction estimation and sound source separation techniques using the array microphone 18 are known techniques, detailed descriptions will be omitted here.

From the results obtained by the detection unit 112 and the direction estimation unit 115, the response determination unit 113 determines whether or not to respond or determines the content of response control with respect to a result of recognition by the voice recognition unit 111. The second embodiment estimates the direction of the sound source with the array microphone 18 to be able to determine whether the sound is emitted by a user or from a radio, a television, or the like, and be able to effectively eliminate the sound that becomes noise for the information processing apparatus 1.

Figure 6:
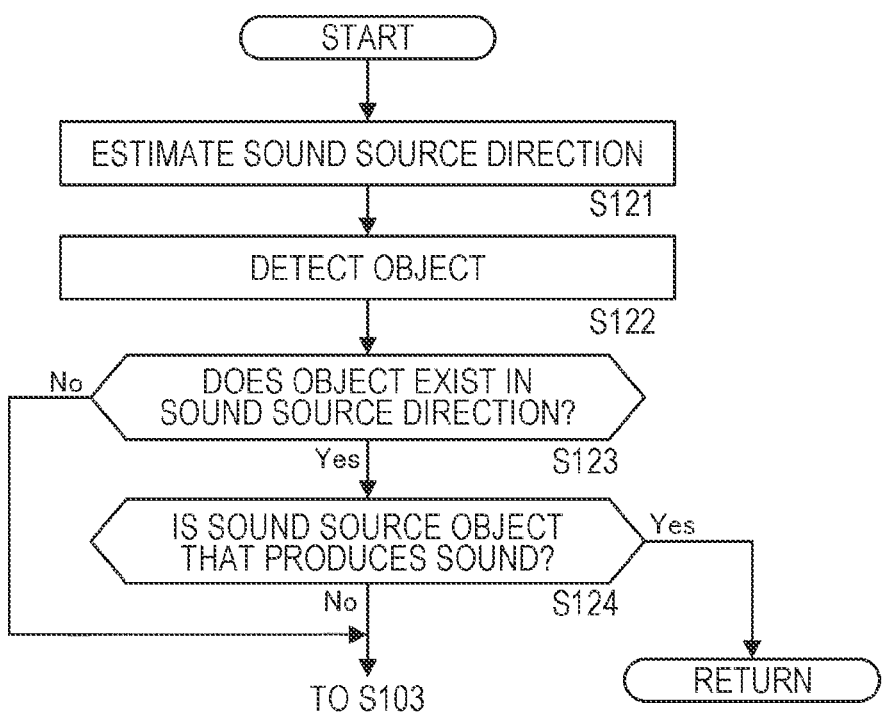
FIG. 6 is a flowchart illustrating control target determination processing of the information processing apparatus according to the second embodiment.

FIG. 6 is a flowchart illustrating control target determination processing of the information processing apparatus 1 according to the second embodiment. This processing corresponds to the control target determination processing (S120) in the response processing of FIG. 4. In the control target determination processing (S120), first, the direction estimation unit 115 estimates a direction (sound source direction) of the sound input to the array microphone 18 (S121). The detection unit 112 then detects a user or an object from an image captured by the camera 13 (S122). Then, in a case where an object exists in the sound source direction estimated (Yes in S123), it is determined whether or not the object is an object that produces sound (S124). An object that produces sound is registered as an object type in the response determination unit 113, so that it can be determined whether or not the object detected is an object that produces sound.

The object that produces sound, that is, an object that becomes a source of noise, can include, for example, one that actually emits voice (human voice) such as a television, a radio, a telephone, a speaker, a game machine, an intercom, a home appliance outputting voice, a toy, or an infant, one that generates an operating sound or the like such as a musical instrument, a toy, a PC keyboard, a faucet with the sound of water flowing therefrom, or various home appliances (such as a dishwasher, a ventilation fan, an air conditioner, or a fan) with operating sounds, or outdoor noise entering through a window or the like.

Note that if a positional relationship between the camera 13 and the array microphone 18 is known in advance, it is possible to know in which region on the image captured by the camera 13 the object is to be detected. Alternatively, if the camera 13 has a mechanism for swinging left and right, the camera 13 can be rotated in the same direction as the sound source direction.

In a case where the sound source is the object that produces sound (Yes in S124), the control target determination processing is ended so that the processing returns to the beginning of the response processing in FIG. 4. Therefore, the response control in the information processing apparatus 1 is disabled. On the other hand, in a case where the sound source is not the object that produces sound (No in S124), there is a possibility that the sound source is the voice emitted by a user, whereby the processing proceeds to S103 of the response processing in FIG. 4 and executes the response control by voice. Similarly, in a case where an object does not exist in the sound source direction (No in S123), there is a possibility that the sound source is the voice emitted by a user, whereby the processing proceeds to S103 of the response processing in FIG. 4.

As described above, according to the second embodiment, the sound source direction is estimated using the array microphone 18, and the response control by voice can be disabled in the case where the sound source is the object that produces sound. For example, in a case where news is on television, radio, or the like, it is possible to inhibit a response to the voice from the television, radio, or the like. It is also possible to prevent a response to not only the voice from the television, radio, or the like but also a sound from a ventilation fan or game machine, a ringtone of a telephone, or the like that are falsely recognized as the voice.

3. Third Embodiment

Figure 7:
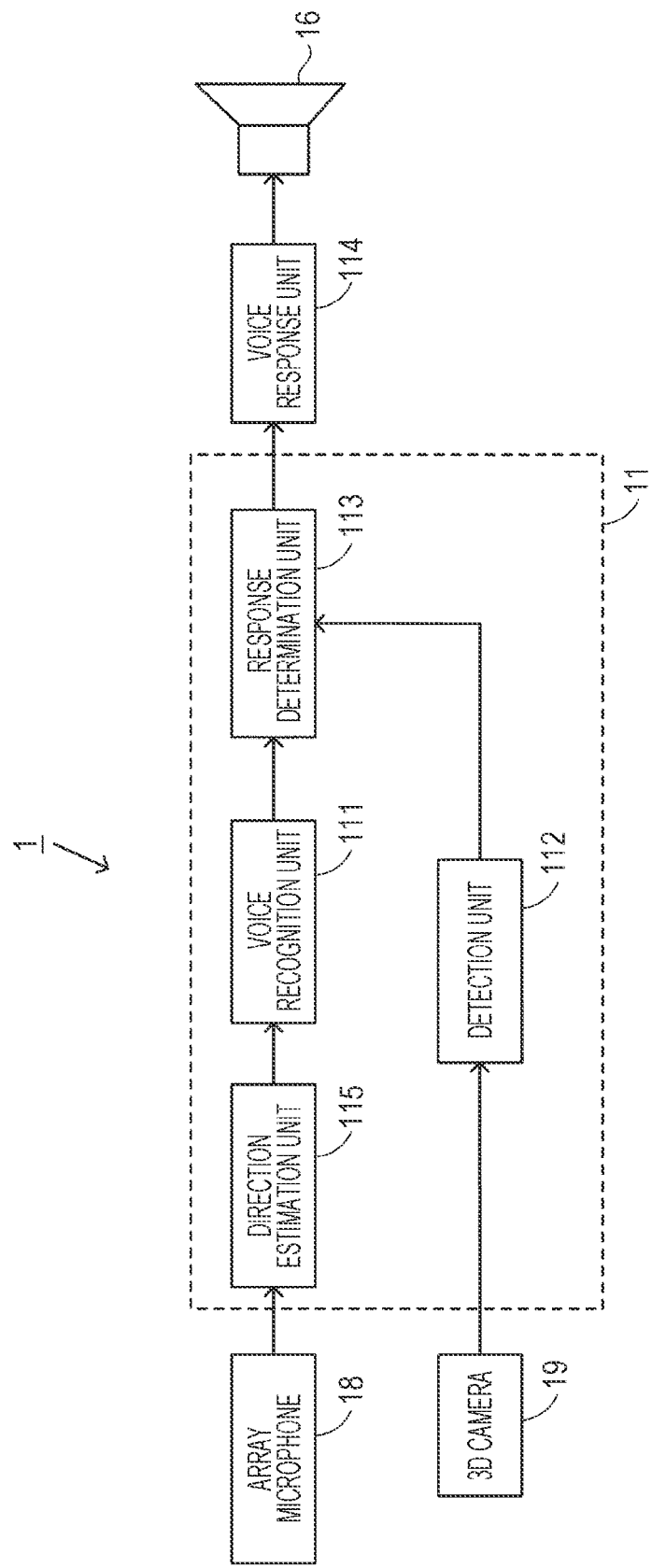
FIG. 7 is a block diagram illustrating a configuration of an information processing apparatus according to a third embodiment.

FIG. 7 is a block diagram illustrating a configuration of an information processing apparatus according to a third embodiment. In FIG. 7, those having the same functions as the ones described in the first embodiment (FIG. 3) and the second embodiment (FIG. 5) are assigned the same reference numerals as those in FIGS. 3 and 5, and the description thereof will be omitted.

The first and second embodiments use the camera 13, whereas the third embodiment is different therefrom in that a 3D camera 19 is used. The 3D camera 19 is a stereo camera using two cameras, a camera equipped with a time of flight (ToF) sensor, or the like and can determine a distance to a physical object imaged. Note that the 3D camera 19 may be one capable of capturing a normal image in addition to being able to measure the distance, and may be in a mode in which a range sensor and a sensor for capturing a normal image are separated. Various modes can be employed as the range sensor such as a radar sensor, a laser sensor, or an ultrasonic sensor.

Figure 8:
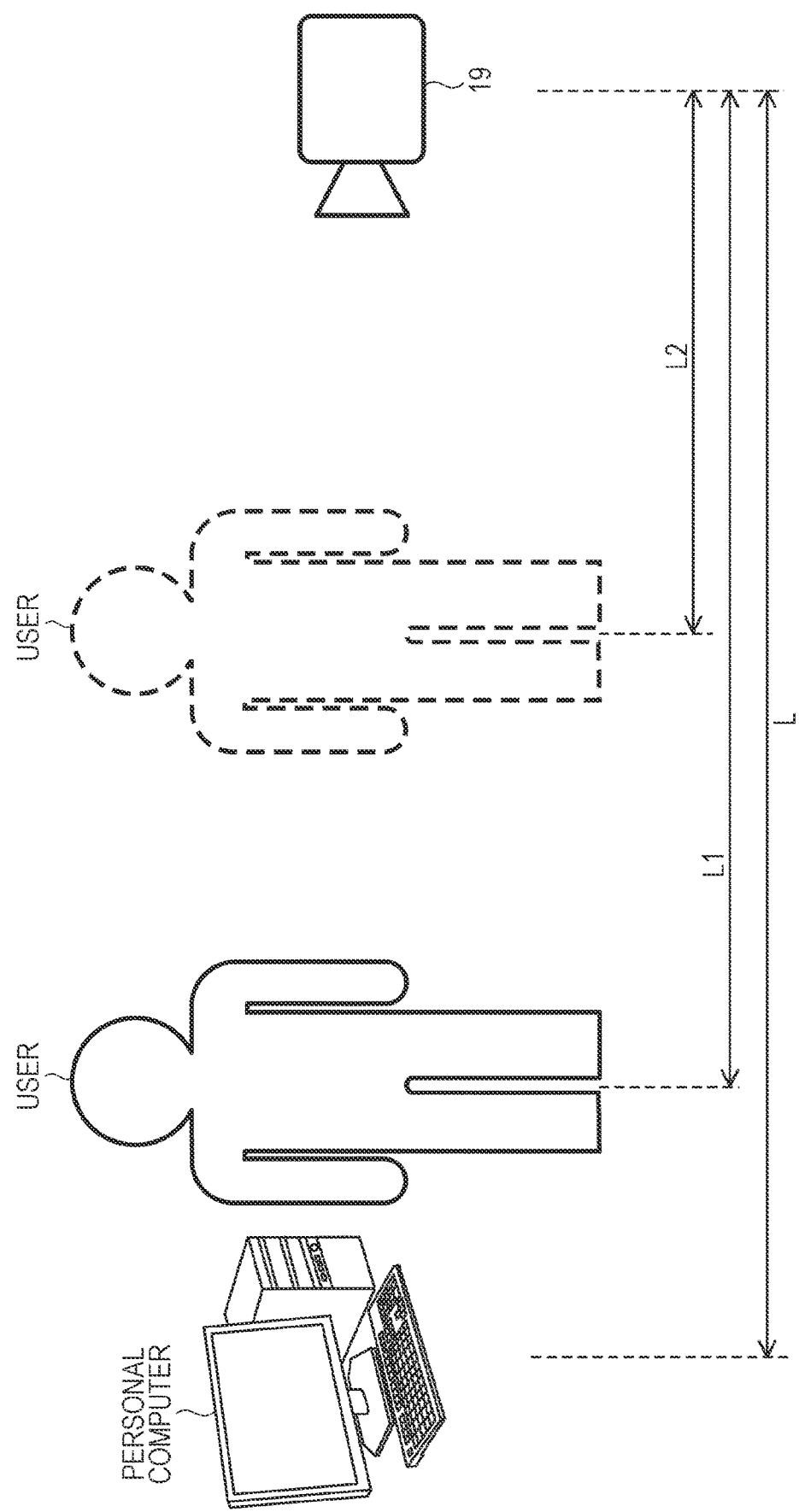
FIG. 8 is a diagram for explaining distance measurement by a 3D camera according to the third embodiment.

FIG. 8 is a diagram for explaining distance measurement by the 3D camera 19 according to the third embodiment. In a situation illustrated in FIG. 8, that is, in a case where a user and a personal computer are lined up in an imaging direction of the 3D camera 19, it is difficult for a camera that captures a two-dimensional image to accurately grasp a positional relationship between the user and the personal computer. Therefore, it is impossible to accurately determine a situation of the user that the user is near the personal computer as indicated by the solid line and is using the personal computer, or that the user is away from the personal computer as indicated by the broken line and is not using the personal computer.

In the third embodiment, the 3D camera 19 is used to measure the distances to the user and an object (personal computer) so that the positional relationship between the user and the object is determined more accurately. The positional relationship between the user and the object is determined more accurately in this way, so that the situation of the user can be estimated more accurately.

In the example of FIG. 8, the detection unit 112 detects the personal computer as the object and measures a distance L to the personal computer on the basis of the output of the 3D camera 19. Note that for the distance measurement by the detection unit 112, a three-dimensional distance is calculated with reference to a certain feature point such as the center of gravity or the center of the object (or the user), for example. In the case of the user indicated by the solid line, the detection unit 112 measures a distance L1 to the user on the basis of the output of the 3D camera 19. In a case where a difference between the distance L to the personal computer and the distance L1 to the user (solid line) is within a predetermined threshold, the response determination unit 113 determines that the personal computer and the user are in a close relationship, and that the user is using the personal computer.

On the other hand, in the case of the user indicated by the broken line, the detection unit 112 measures a distance L2 to the user on the basis of the output of the 3D camera 19. In a case where a difference between the distance L to the personal computer and the distance L2 to the user (broken line) exceeds a predetermined threshold, the response determination unit 113 determines that the personal computer and the user are away from each other, and that the user is not using the personal computer. Note that although the present embodiment measures the distances from the 3D camera 19 to the object (personal computer) and the user, a distance between the object (personal computer) and the user may be measured. In that case, the distance need only be set to infinity in a case where zero or one physical object is detected as a result of the detection.

As described above, in the third embodiment, the positional relationship between the user and the object is determined more accurately by using the 3D camera 19, whereby the situation of the user can be estimated more accurately. Therefore, it is possible to accurately grasp the situation of the user and properly make a response. Although the positional relationship between the personal computer and the user has been described with reference to FIG. 8, it is not limited to this example. For example, in a case where a distance between a telephone and a user is close enough, it is possible to determine that the user is in a call and inhibit a response by voice. Also, In a case where a distance between a study desk and a user is close enough, it is possible to determine that the user is studying and make a response not to disturb the studying by responding only to an item related to the studying, reducing the volume of the response, or the like.

4. Fourth Embodiment

Figure 9:
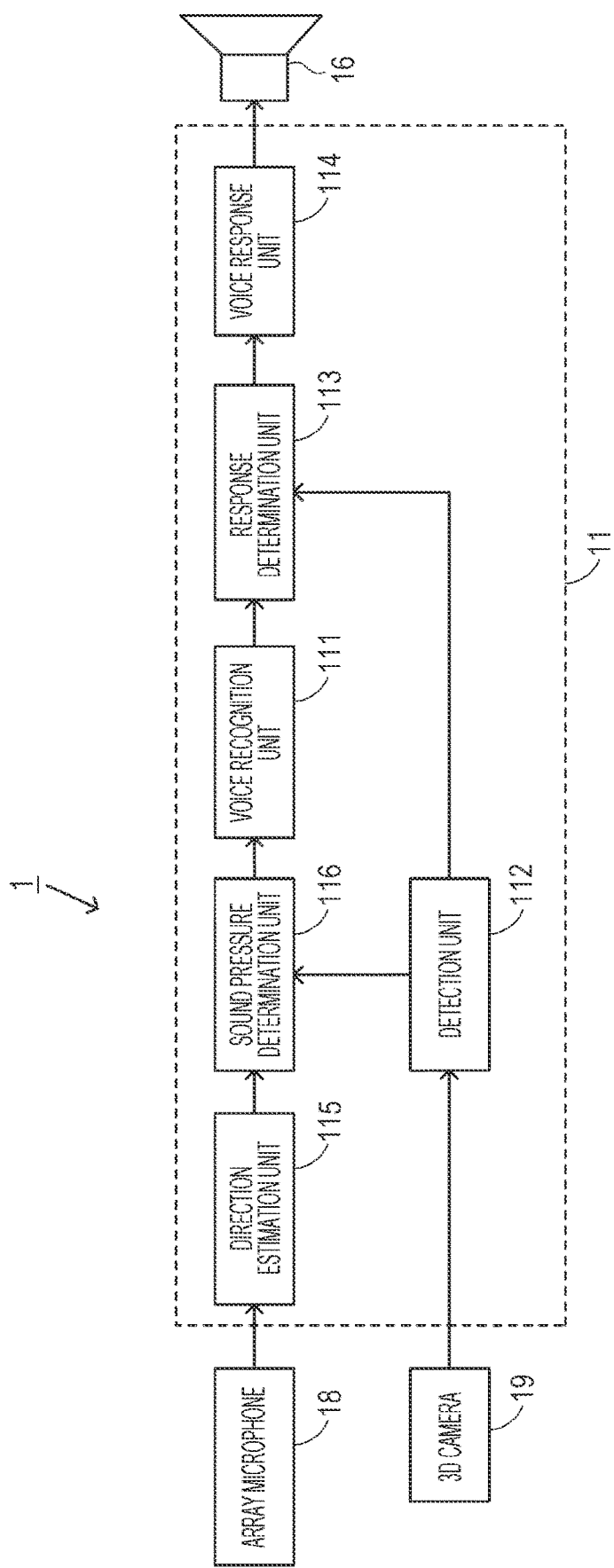
FIG. 9 is a block diagram illustrating a configuration of an information processing apparatus according to a fourth embodiment.

FIG. 9 is a block diagram illustrating a configuration of an information processing apparatus according to a fourth embodiment. In FIG. 9, those having the same functions as the ones described in the first to third embodiments (FIGS.

3, 5, and 7) are assigned the same reference numerals as those in FIGS. 3, 5, and 7, and the description thereof will be omitted.

The fourth embodiment is different from the first to third embodiments in that a sound pressure determination unit 116 is provided for determining a sound pressure of a sound received by the array microphone 18 (or the microphone 17). In the fourth embodiment, it is determined whether or not a user has issued a command to the information processing apparatus 1 on the basis of a distance to the user imaged by the 3D camera 19 and a sound pressure of a voice uttered by the user. The sound pressure determination unit 116 receives the sound input to the array microphone 18 and the distance to the user obtained by the detection unit 112, and determines whether or not to pass the sound input to the voice recognition unit 111.

Figure 10:
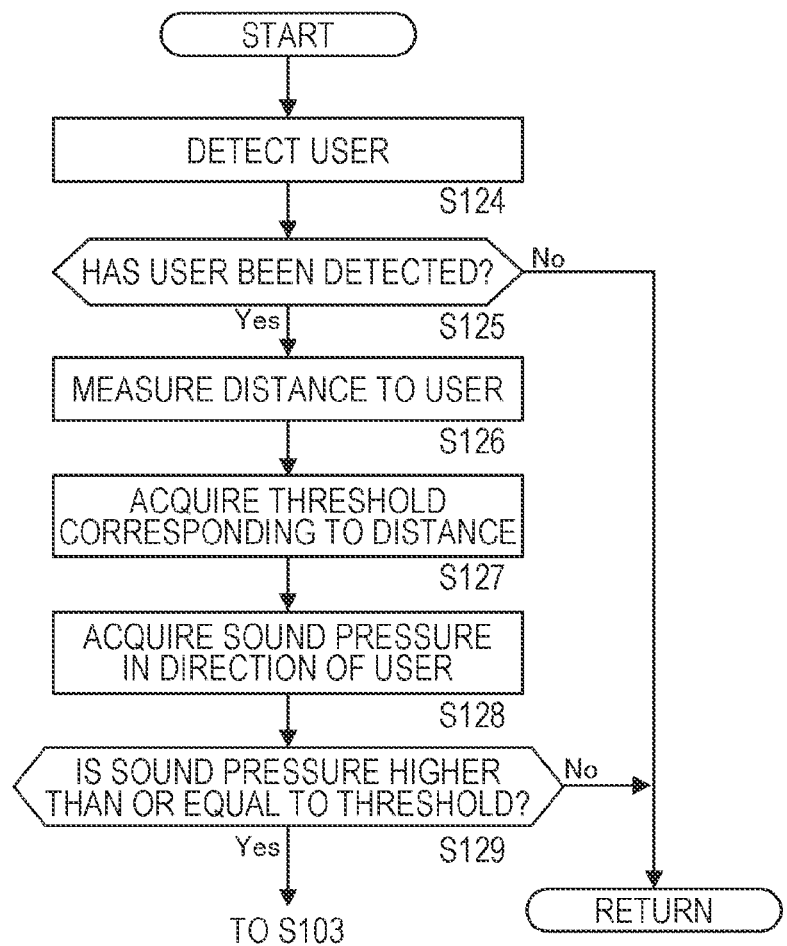
FIG. 10 is a flowchart illustrating control target determination processing of the information processing apparatus according to the fourth embodiment.

FIG. 10 is a flowchart illustrating control target determination processing of the information processing apparatus 1 according to the fourth embodiment. This processing corresponds to the control target determination processing (S120) in the response processing of FIG. 4. In the control target determination processing (S120), first, a user is detected from a captured image on the basis of output from the 3D camera 19. In a case where a user has been detected (Yes in S125), a distance to the user is measured on the basis of the output from the 3D camera 19 (S126). Then, a threshold corresponding to the distance measured is acquired (S127). This threshold is stored beforehand in the control unit 11 in association with the distance, and can be extracted with the distance to the user as an input.

Next, the sound pressure determination unit 116 acquires a sound pressure in a direction of the user detected (S128). Here, an estimated result of the direction obtained by the direction estimation unit 115 is used, but by taking advantage of the feature that the directivity of the array microphone 18 can be freely set, the array microphone 18 may be directed toward the direction of the user detected to acquire the sound pressure at that time. Then, the sound pressure determination unit 116 determines whether or not the sound pressure acquired is higher than or equal to a threshold (S129). In a case where the sound pressure is higher than or equal to the threshold (Yes in S129), the processing proceeds to S103 of the response processing in FIG. 4, and the response control by voice is executed. In the block diagram of FIG. 9, the input sound is passed to the voice recognition unit 111. On the other hand, in a case where the sound pressure is lower than the threshold (No in S129), the control target determination processing is ended so that the processing returns to the beginning of the response processing in FIG. 4. In the block diagram of FIG. 9, the input sound is discarded without being passed to the voice recognition unit 111, and the subsequent response control is stopped.

In a case where the user speaks (issues a command) to the information processing apparatus 1 in a situation that the information processing apparatus 1 is far enough from the user, the user characteristically speaks in a loud voice. The fourth embodiment takes advantage of this characteristic and effectively determines whether the user is speaking to the information processing apparatus 1 or is not speaking thereto (for example, speaking to himself, having a conversation with another user, or the like) on the basis of a relationship between the distance to the user and the sound pressure of the user's utterance collected, thereby being able to prevent a response in the case where the user is not speaking to the information processing apparatus 1.

Note that within the fourth embodiment, the information processing apparatus 1 may employ only the part for determining whether or not the user is speaking to the information processing apparatus 1, that is, the part for measuring the distance from the information processing apparatus 1 to the user and determining that the user is speaking to the information processing apparatus 1 in a case where the sound pressure of a sound signal collected by the array microphone 18 (or a normal microphone) satisfies a predetermined condition, or is higher than or equal to the threshold corresponding to the distance to the user.

5. Fifth Embodiment

Figure 11:
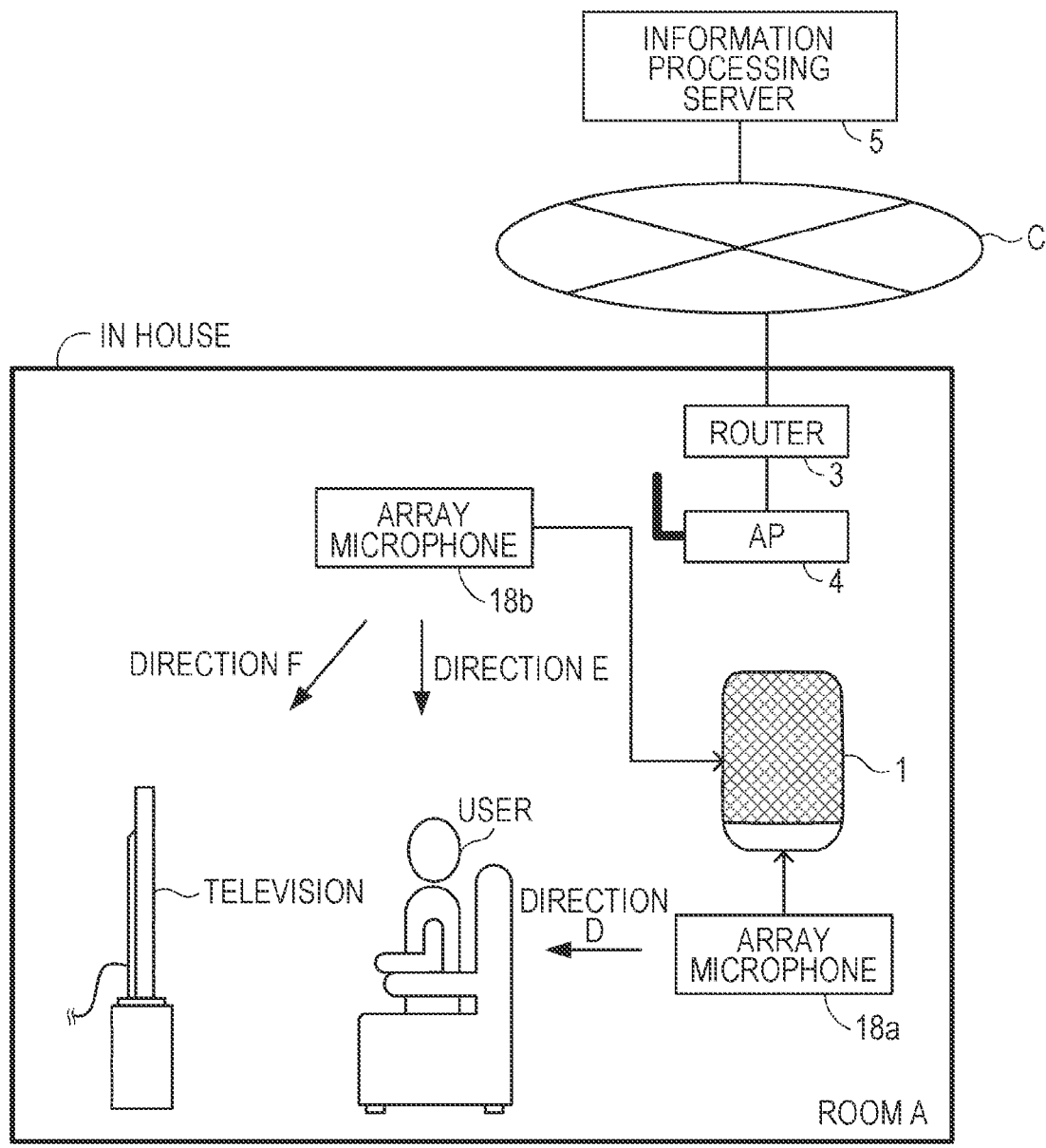
FIG. 11 is a diagram for explaining a use situation of an information processing system according to a fifth embodiment.
Figure 12:
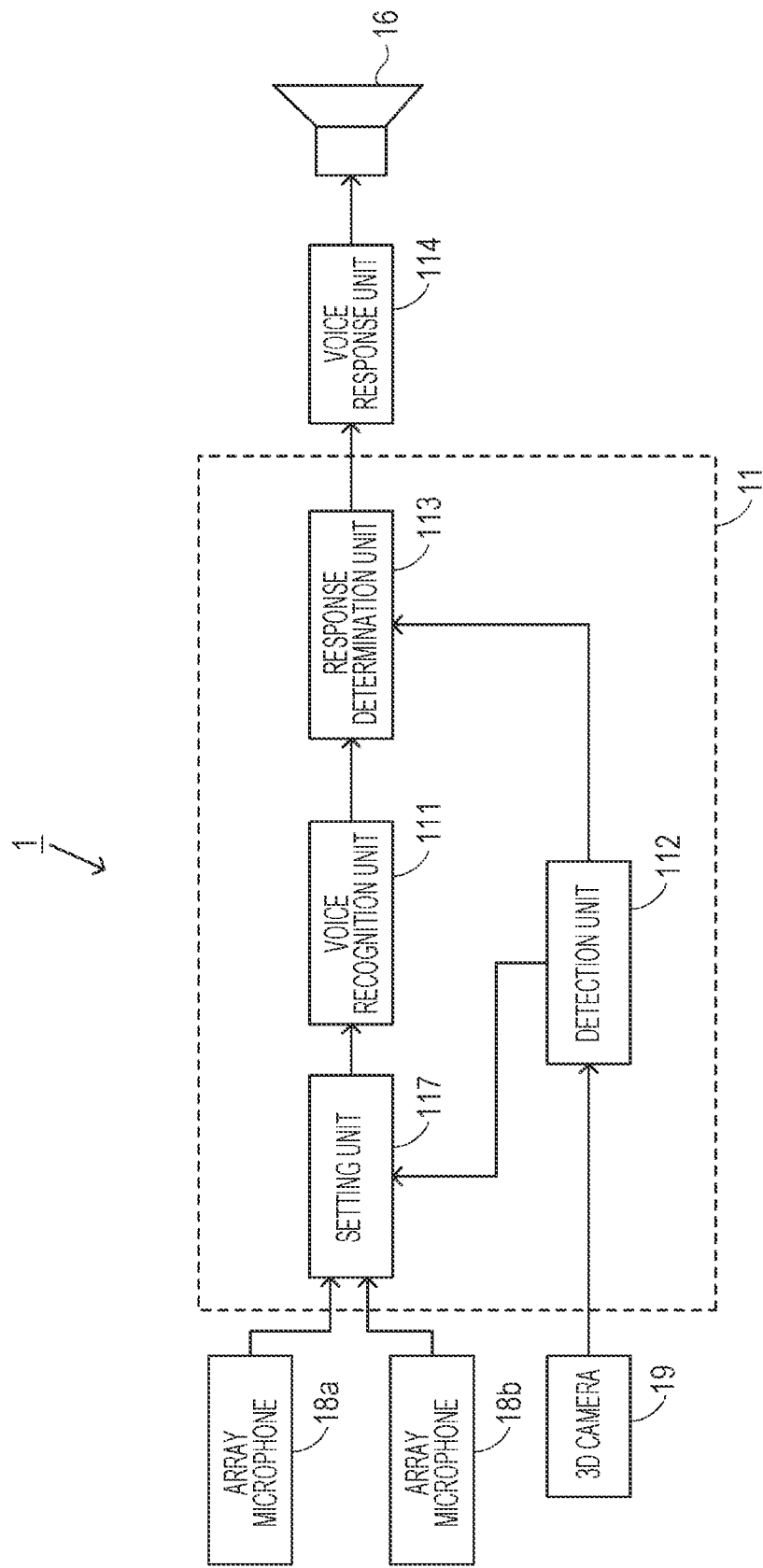
FIG. 12 is a block diagram illustrating a configuration of an information processing apparatus according to the fifth embodiment.

FIG. 11 is a diagram for explaining a use situation of an information processing system according to a fifth embodiment. Moreover, FIG. 12 is a block diagram illustrating a configuration of the information processing apparatus 1 according to the fifth embodiment. In FIGS. 11 and 12, those having the same functions as the ones described in the first to fourth embodiments (FIGS. 1, 3, 5, 7, 9, and the like) are assigned the same reference numerals as those in FIGS. 1, 3, 5, 7, 9, and the like, and the description thereof will be omitted.

The fifth embodiment is different in that a plurality of the array microphones 18 used in the second embodiment is provided. In FIG. 11, in a case where a user is watching television, the sound source can be the voice from the television or the voice of the user. In a case where one array microphone 18a is used in such a situation, the user and the television are positioned in the same direction (direction D) with respect to the array microphone 18a, making it difficult to determine whether the sound source is the voice from the television or the voice of the user. Also, in a case where both the television and the user produce sound at the same time, there is a possibility that the voices of the two are mixed and that the voice of the user cannot be acquired correctly.

In the fifth embodiment, the plurality of array microphones 18a and 18b is provided and arranged at different positions to extract only the voice from a required direction. Note that the array microphones 18a and 18b can be arranged at appropriate positions outside the information processing apparatus 1. In such a configuration, a setting unit 117 makes a selection from the array microphones 18a and 18b and adjusts the directivity thereof, whereby only the voice component from the required direction can be extracted.

Figure 13:
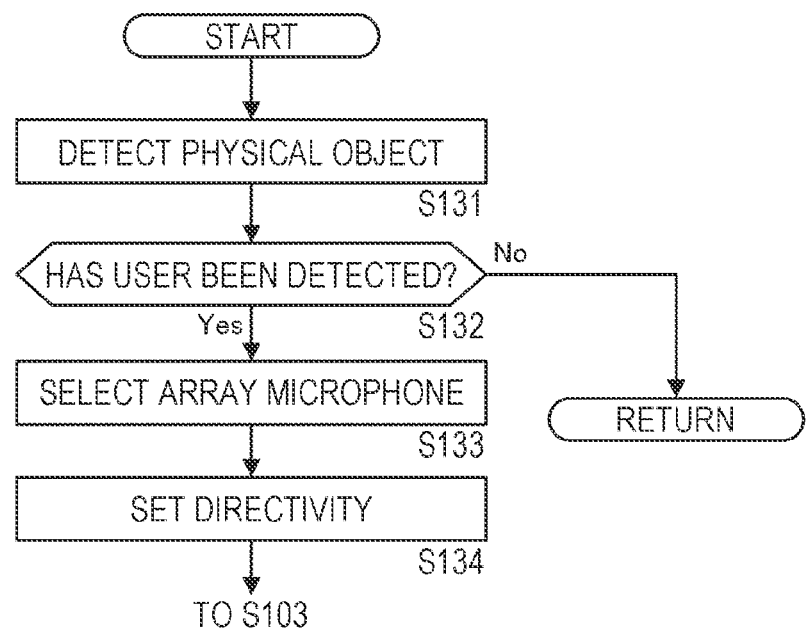
FIG. 13 is a flowchart illustrating control target determination processing of the information processing apparatus according to the fifth embodiment.

FIG. 13 is a flowchart illustrating control target determination processing of the information processing apparatus 1 according to the fifth embodiment. This determination processing (S120) first executes detection of physical objects, that is, detection of a user and an object (S131). For example, in the environment of FIG. 11, the television and the user are detected by the 3D camera 19 provided in the information processing apparatus 1. Then, in a case where the user has been detected among the physical objects detected (Yes in S132), the one array microphone 18b suitable for detecting the voice of the user is selected (S133). As described above, in the environment of FIG. 11, the array microphone 18a is unsuitable for acquiring the voice of the user because the user and the television are positioned in the same direction. Accordingly, the array microphone 18b with a direction of the user (direction E) different from a direction of the television (direction F) is selected. Note that in a case where no user has been detected (No in S132), there is no user from whom voice is to be acquired, whereby the processing returns to the beginning of the response processing.

Furthermore, the directivity of the array microphone 18b is adjusted to the direction of the user (direction E) so that the voice of the user is accurately acquired (S134). As described above, the plurality of array microphones 18a and 18b is provided, the appropriate array microphone 18b is selected on the basis of the situation of the user acquired by the 3D camera 19, and the directivity of the array microphone 18b is adjusted, whereby the voice of the user can be accurately acquired while preventing or reducing the influence of noise other than the voice of the user.

According to the fifth embodiment described above, the voice of the user can be more accurately extracted from various noise sources in the house, and a proper response can be made to the user. In addition, increasing the number of the array microphones 18a and 18b can cover noise sources in a wider range and at various positions. Note that although the fifth embodiment makes the selection from the plurality of array microphones 18a and 18b and adjusts the directivity of the array microphone 18a or 18b selected, only the selection from the plurality of array microphones 18a and 18b may be made on the basis of the situation of the user acquired by the 3D camera 19. Alternatively, one of the array microphones 18a and 18b may be installed, and the directivity thereof may be adjusted on the basis of the situation of the user acquired by the 3D camera 19. It is also possible to use the normal camera 13 instead of using the 3D camera 19.

6. Sixth Embodiment

Figure 14:
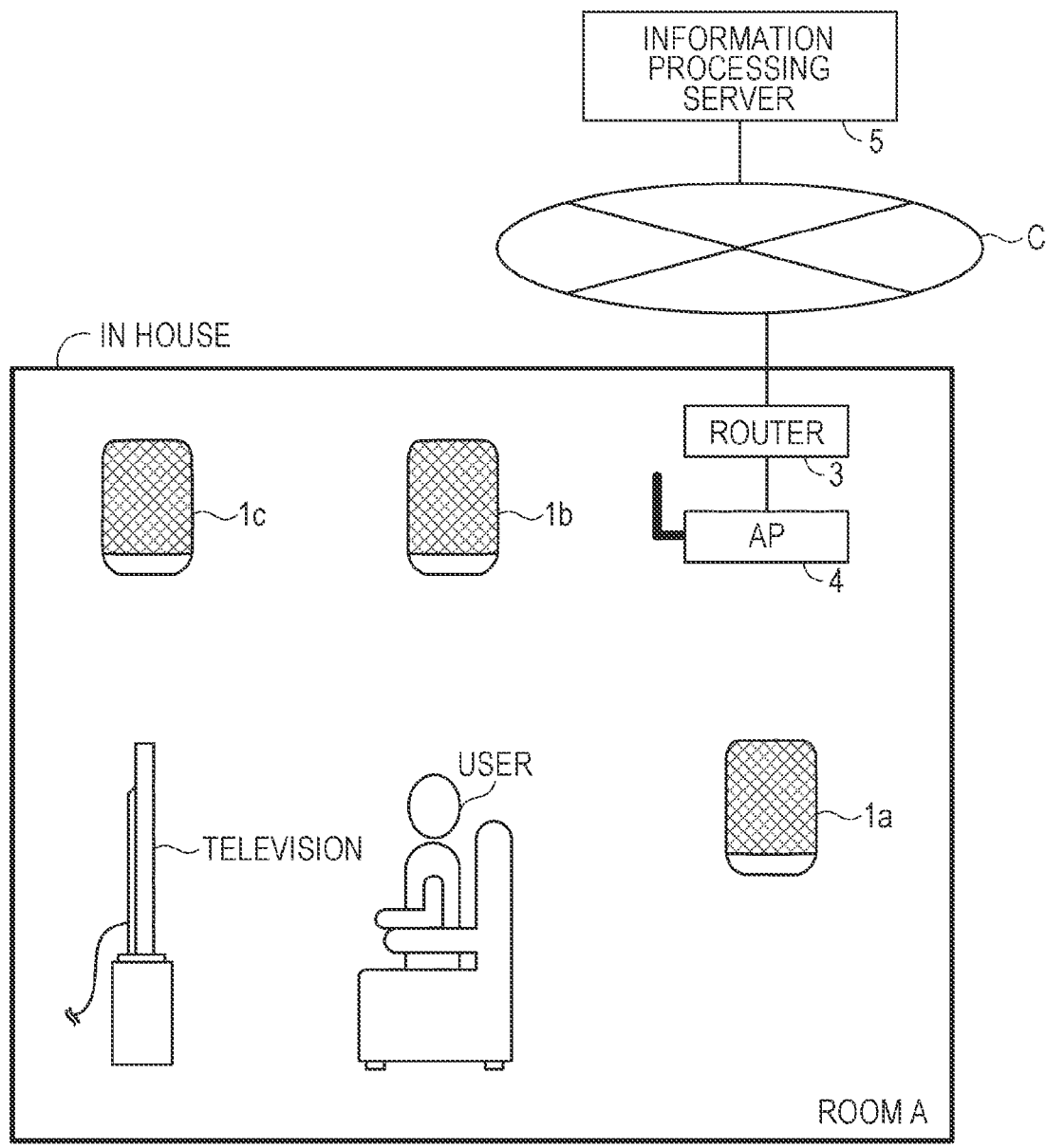
FIG. 14 is a diagram for explaining a use situation of an information processing system according to a sixth embodiment.

FIG. 14 is a diagram for explaining a use situation of an information processing system according to a sixth embodiment. In FIG. 14, those having the same functions as the ones described in the first and fifth embodiments (FIGS. 1 and 11) are assigned the same reference numerals as those in FIGS. 1 and 11, and the description thereof will be omitted.

In the sixth embodiment, a plurality of information processing apparatuses 1a to 1c is installed in the house. Note that the information processing apparatuses 1a to 1c illustrated in FIG. 14 are all in the form of smart speakers in the drawing, but any of the information processing apparatuses 1a to 1c can be in another form as appropriate such as a television, a robot, or a computer. The information processing apparatuses 1a to 1c each have the same configuration as the information processing apparatus 1 described with reference to FIG. 2, and are connected to the access point 4 so as to be able to perform wireless communication therewith. The information processing apparatuses 1a to 1c are also connected to the same LAN network and can communicate with one another. Note that the information processing apparatuses 1a to 1c may be connected to the LAN network by wire. In the sixth embodiment, the plurality of information processing apparatuses 1a to 1c performs communication with one another and makes negotiations according to the situation of the user, whereby a proper voice response can be made to the user.

In FIG. 14, for example, the information processing apparatus 1a is installed in front of a television so that, in a case where it is determined that a user is watching the television, that is, in a case where the television and the user are in the same direction with respect to the information processing apparatus 1a, voice recognition by the information processing apparatus 1a is avoided, or a result thereof is not used. On the other hand, the information processing apparatuses 1b and 1c are arranged at positions not easily affected by the voice output from the television, and thus make a proper response to the user by using the method described in the first to fifth embodiments. At that time, in a case where the content of the response by the information processing apparatus 1b matches that by the information processing apparatus 1c, it is determined which of the information processing apparatuses 1b and 1c makes a response. Moreover, regarding a response based on a result of voice recognition, any of the information processing apparatuses 1a to 1c closest to the user can return the response, for example.

Moreover, in a case where the contents of the response do not match between the information processing apparatuses 1b and 1c, it is preferable to determine the information processing apparatus 1b or 1c for making the response in the following order or priority. First, priority is given to the information processing apparatus 1b or 1c having a higher degree of certainty of recognition regarding the results of voice recognition. In a case where the results of voice recognition have the same degree of certainty of recognition, priority is given to the information processing apparatus 1b or 1c whose angle of the microphone is closer to the front of the user. Nevertheless, in a case where the angles of the microphones 1b and 1c are equal, priority can be given to the information processing apparatus 1b or 1c closer to the user. Such a mode allows for the use of the information processing apparatus 1b or 1c whose result of voice recognition is assumed to be more appropriate.

In the case where the plurality of information processing apparatuses 1a to 1c is used, descriptions will be given of processing (first selection processing) that selects any one of the information processing apparatuses 1a to 1c for detecting physical objects (user and object) and detecting a situation of the user, and processing (second selection processing) that selects any one of the information processing apparatus 1a to 1c whose result of voice recognition is adopted.

Figure 15:
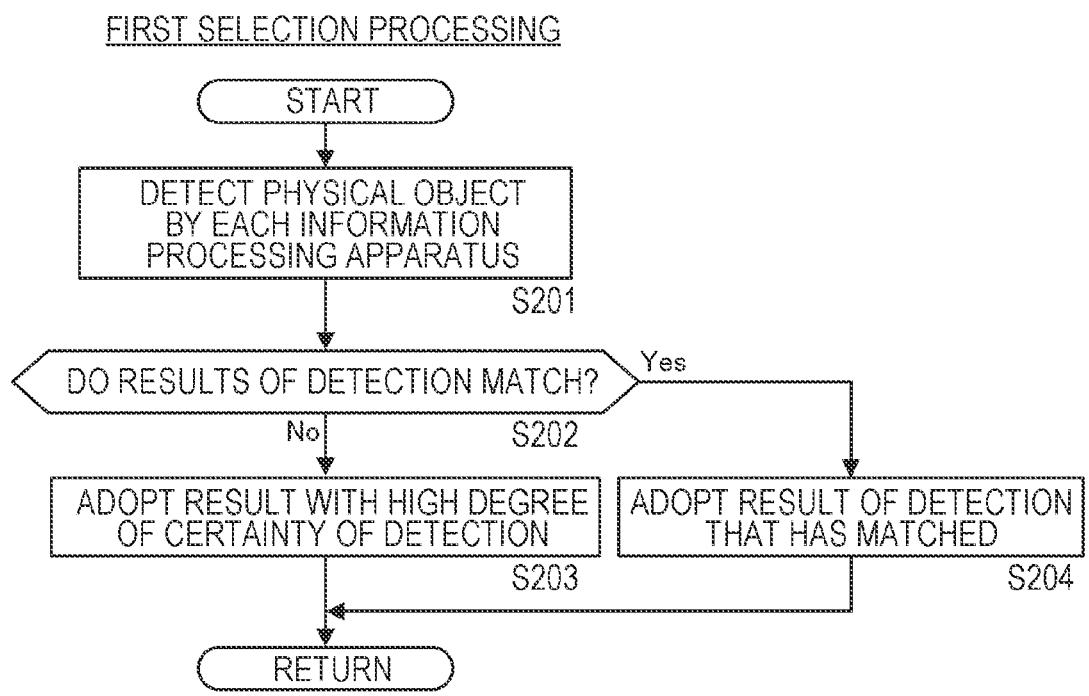
FIG. 15 is a flowchart illustrating first selection processing executed among a plurality of information processing apparatuses.

FIG. 15 is a flowchart illustrating the first selection processing executed among the plurality of information processing apparatuses 1a to 1c. The first selection processing is processing for selecting any one of the information processing apparatuses 1a to 1c whose result of detection of physical objects (user and object) is adopted. Each of the information processing apparatuses 1a to 1c executes detection of physical objects (S201). At that time, a degree of certainty of detection for a result of the detection of physical objects is also calculated. The degree of certainty of detection is a numerical value indicating the certainty of the result of the detection of physical objects and indicates, for example, that the higher the numerical value, the more accurate the result.

In a case where the results of the detection by the information processing apparatuses 1a to 1c match (Yes in S202), the results of the detection by all the information processing apparatuses 1a to 1c are the same so that the result of the detection that has matched is adopted (S204). On the other hand, in a case where the results of the detection are different (No in S202), the result of the detection with a high degree of certainty of detection is to be adopted (S203). As described with reference to FIG. 14, in the case where the television, the user, and the information processing apparatus 1a are lined up in a straight line, it is possible that physical objects cannot be detected correctly or the situation of the user cannot be determined correctly. In such a case, it is possible that a low degree of certainty of detection is calculated for the result of the detection by the information processing apparatus 1a. Accordingly, the situation of the user can be determined correctly by adopting the result of the detection by the information processing apparatus 1b or 1c for which a high degree of certainty of detection is calculated.

Figure 16:
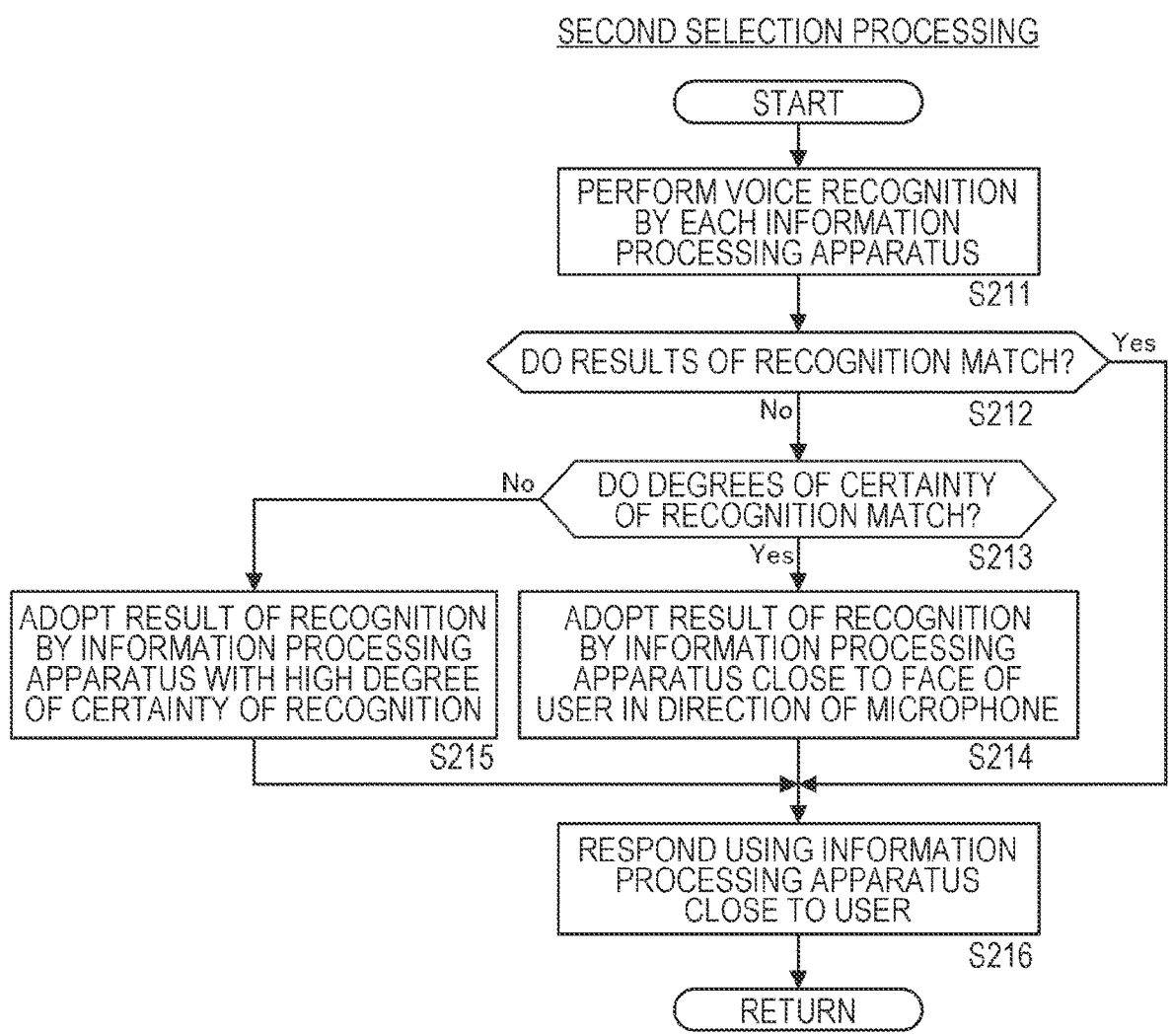
FIG. 16 is a flowchart illustrating second selection processing executed among the plurality of information processing apparatuses.

FIG. 16 is a flowchart illustrating the second selection processing executed among the plurality of information processing apparatuses 1a to 1c. The second selection processing is processing for selecting any one of the information processing apparatuses 1a to 1c whose result of voice recognition is adopted. Each of the information processing apparatuses 1a to 1c executes voice recognition processing on the basis of input voice (S211). At that time, a degree of certainty of recognition for a result of the voice recognition is also calculated. The degree of certainty of recognition is a numerical value indicating the certainty of the result of the voice recognition and indicates, for example, that the higher the numerical value, the more accurate the result. In a case where the results of the voice recognition match (Yes in S212), the results of the voice recognition by all the information processing apparatuses 1a to 1c are the same so that the result of the voice recognition that has matched is adopted, and the information processing apparatus close to the user makes a response (S216).

On the other hand, in a case where the results of the voice recognition differ among the information processing apparatuses 1a to 1c (No in S212), the degrees of certainty of recognition calculated for the results of the voice recognition are referenced (S213). In a case where the degrees of certainty of recognition match (Yes in S213), that is, in a case where the results of the voice recognition all have the same degree of certainty, the result of the recognition by any of the information processing apparatuses 1a to 1c having a close positional relationship to the face of the user along the direction of the microphone is adopted (S214). On the other hand, in a case where the degrees of certainty of recognition are different (No in S213), the result of the recognition by any of the information processing apparatuses 1a to 1c having the highest degree of certainty of recognition is adopted (S215). Then, on the basis of the result of the recognition, any of the information processing apparatuses 1a to 1c having a close positional relationship to the user responds by using voice (S216).

As described above, in the sixth embodiment, the plurality of information processing apparatuses 1a to 1c operates in coordination with one another to be able to perform more accurate response control for the user. Furthermore, the plurality of information processing apparatuses 1a to 1c is present so that, even in a case where a plurality of users is present, a response can be returned to each of the users.

Note that with the plurality of information processing apparatuses 1a to 1c arranged as in the sixth embodiment, in order to make it easy to see which of the information processing apparatuses 1a to 1c is responding to the user, the touch panel display unit 15 of the responding one of the information processing apparatuses 1a to 1c or a display unit such as a light emitting diode (LED) provided separately may be used to display that the response is in progress. At that time, in a case where different ones of the information processing apparatuses 1a to 1c respond to a plurality of users, it is preferable to make a distinction by using different colors of the LED or the like. Alternatively, instead of displaying by color, the touch panel display unit 15 may for example display the name of the user to whom the response is currently being made, or a character string indicating the content of the interaction.

7. Seventh Embodiment

Figure 17:
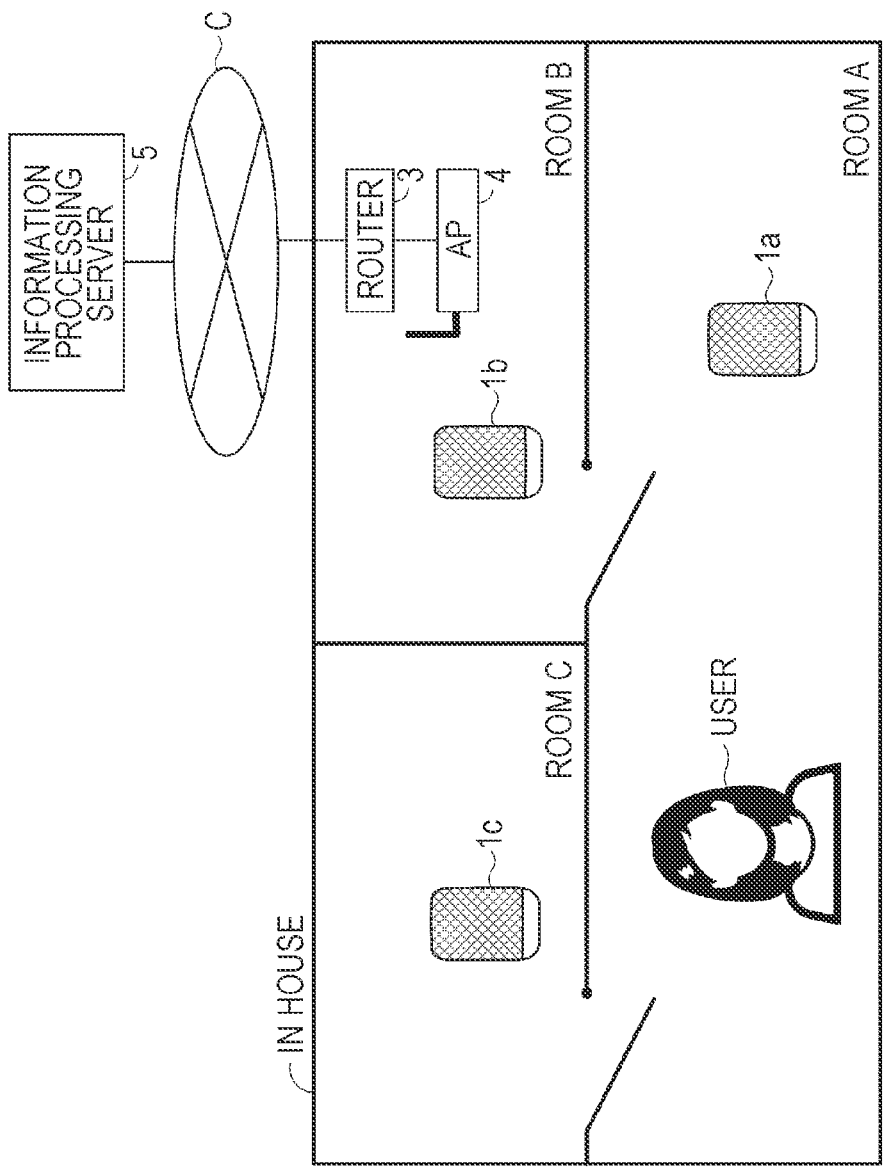
FIG. 17 is a diagram for explaining a use situation of an information processing system according to a seventh embodiment.

FIG. 17 is a diagram for explaining a use situation of an information processing system according to a seventh embodiment. In FIG. 17, those having the same functions as the ones described in the first embodiment (FIG. 1) are assigned the same reference numerals as those in FIG. 1, and the description thereof will be omitted. In the seventh embodiment, as illustrated in FIG. 17, the information processing apparatuses 1a to 1c are installed in three rooms (rooms A, B, and C), respectively. As in the case of FIG. 14, the information processing apparatuses 1a to 1c are wirelessly connected to the access point 4 and can communicate with one another. Also, as described in the first to sixth embodiments, each of the information processing apparatuses 1a to 1c determines a situation of a user on the basis of an image captured by the camera 13 or the 3D camera 19 and can make a voice response corresponding to the situation.

In the case where the plurality of information processing apparatuses 1a to 1c is installed in the house as described above and the user in room A makes an inquiry of the information processing apparatus 1a in a loud voice, it is possible that the inquiry reaches the information processing apparatuses 1b and 1c arranged in the adjacent rooms B and C. The seventh embodiment takes advantage of the feature that each of the information processing apparatuses 1a to 1c can determine the situation of the user on the basis of the image captured by the camera 13 or the 3D camera 19, and inhibits a response in a situation where the presence of the user cannot be confirmed even in a case where voice is input.

In addition, by adding a face identification function to the detection unit 112 mounted on each of the information processing apparatuses 1a to 1c and a speaker identification function to the voice recognition unit 111, it is possible to determine the user who has spoken from the image and make a response, so that the information processing apparatus 1a alone can respond even if there is another user in room B or C. The plurality of information processing apparatuses 1a to 1c in the different rooms operates in coordination with one another as described above, whereby an appropriate one of the information processing apparatuses 1a to 1c can be selected to make a response to the user. Moreover, in the case where the plurality of information processing apparatuses 1a to 1c is installed, the touch panel display unit 15 of each of the information processing apparatuses 1a to 1c may display a situation of the user detected by another one of the information processing apparatuses 1a to 1c. In FIG. 17, for example, in a case where the information processing apparatus 1b in room B has determined the situation of the user in room B to be "studying", the touch panel display unit 15 of the information processing apparatus 1a in another room, for example, room A, can display that the user in room B is "studying". With such a configuration, a user in one room can visually know a situation of a user in another room by the display unit such as the touch panel display unit 15, thereby being able to take an action according to the situation of the user in the other room. For example, in the case where the information processing apparatus 1a has displayed that the situation of the user in room B is "studying", the user in room A can take an action such as avoiding speaking to the user in room B so as not to disturb his studying.

8. Eighth Embodiment

Figure 18:
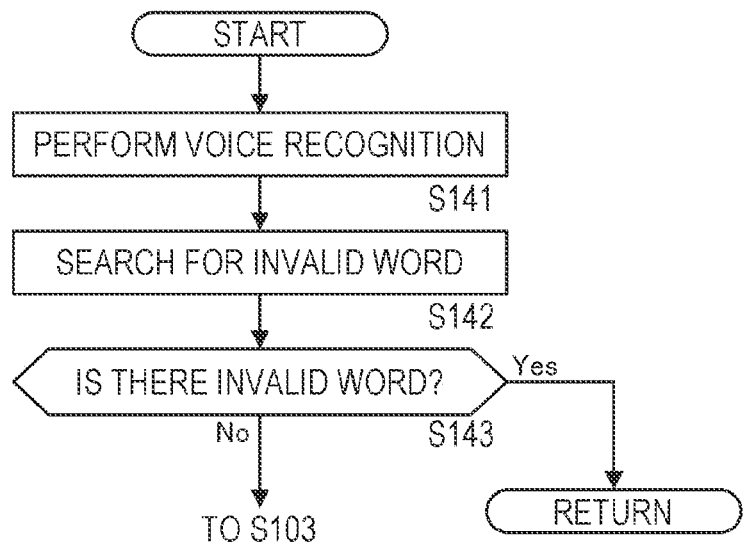
FIG. 18 is a flowchart illustrating control target determination processing of an information processing apparatus according to an eighth embodiment.

FIG. 18 is a flowchart illustrating control target determination processing of an information processing apparatus according to an eighth embodiment. As the information processing apparatus 1, the information processing apparatus 1 described in the first to seventh embodiments can be used.

In a case where a sound signal has been detected in the response processing of FIG. 4 (Yes in S101), voice recognition is executed for the sound signal input (S141). Then, a search for an invalid word registered in advance in the control unit 11 or the like is executed for a result of the voice recognition (S142). In a case where an invalid word has been detected as a result of the search (Yes in S143), the subsequent processing is stopped, and the processing returns to the beginning of the response processing. On the other hand, in a case where an invalid word has not been detected (No in S143), the processing proceeds to S103 and executes response control by voice.

By such determination processing, for example, a word "hey" in the words such as "hey, mom" that a user usually speaks to his mother can be registered in advance as the invalid word so that, when the user utters "hey" at the time of interacting with the information processing apparatus 1, a response by the information processing apparatus 1 is disabled and that the information processing apparatus 1 can avoid mistakenly responding to the conversation between the user and the mother. Also, when the user calls "hey, mom" while the mother is interacting with the information processing apparatus 1, the information processing apparatus 1 may discontinue or halt the interaction with the mother to allow the user to interrupt and have a conversation with the mother and facilitate the conversation between the user and the mother.

According to the eighth embodiment, the information processing apparatus 1 can avoid mistakenly interrupting a conversation between users by registering words that the user, user's family, friends, and the like usually call each other as the invalid words. Note that the invalid word may be registered by the user himself in the information processing apparatus 1, or may be automatically registered from a result of learning a user's conversation input to the information processing apparatus 1.

The present disclosure can also be implemented by an apparatus, a method, a program, a system, or the like. For example, a program for performing the function described in the above embodiment can be made available for download, and an apparatus that does not have the function described in the embodiment can download the program to perform the control described in the embodiment on the apparatus. The present disclosure can also be implemented by a server that distributes such a program. Moreover, the items described in the embodiments and variations can be combined as appropriate.

The present disclosure can also take the following configurations.

(1)

An information processing apparatus including:

a detection unit that detects a positional relationship between a user and an object on the basis of an image captured by a camera;

a determination unit that determines a situation of the user on the basis of the positional relationship between the user and the object detected by the detection unit; and a response control unit that executes a voice response corresponding to the situation of the user determined by the determination unit.

(2)

The information processing apparatus according to (1), in which the detection unit detects a positional relationship between a part of the user and the object, and the determination unit determines the situation of the user on the basis of the positional relationship between the part of the user and the object.

(3)

The information processing apparatus according to (1) or (2), in which the response control unit controls at least one of whether or not to make a voice response, content of a response, volume of voice, speed of voice, sound quality of voice, or a type of voice in accordance with the situation of the user.

(4)

The information processing apparatus according to any one of (1) to (3), in which the response control unit executes the voice response on the basis of a sound signal collected by a microphone.

(5)

The information processing apparatus according to (4), in which the microphone is an array microphone that can detect a direction of the sound signal collected.

(6)

The information processing apparatus according to (5), in which the response control unit does not execute the voice response in a case where an object that produces sound is positioned in the direction of the sound signal collected by the array microphone.

(7)

The information processing apparatus according to (5) or (6), in which directivity of the array microphone is adjusted to a direction of the user detected by the detection unit.

(8)

The information processing apparatus according to any one of (5) to (7), including a plurality of the array microphones, in which the array microphone that collects sound is selected on the basis of the situation of the user determined by the determination unit.

(9)

The information processing apparatus according to any one of (1) to (8), including a measurement unit that can measure a distance between the user and the object, in which the determination unit determines the situation of the user on the basis of a positional relationship between the user and the object including the distance between the user and the object.

(10)

The information processing apparatus according to any one of (1) to (9), including a measurement unit that measures a distance to the user, in which the response control unit executes the voice response in a case where the distance to the user measured by the measurement unit and a sound pressure of the sound signal collected by the microphone satisfy a predetermined condition.

(11)

The information processing apparatus according to any one of (1) to (10), in which the information processing apparatus further includes a display unit, and the display unit displays at least any of a fact that a response is in progress, a reason for not responding, or a situation of a room.

(12)

The information processing apparatus according to any one of (1) to (11), in which the determination unit determines the situation of the user on the basis of an invalid word.

(13)

The information processing apparatus according to any one of (1) to (12), in which the situation of the user includes at least any of a state or an action of the user.

(14)

The information processing apparatus according to (13), in which the situation of the user includes at least any of a sleeping situation, a relaxing situation, a situation of watching television, or a situation of having a conversation with a family member.

(15)

An information processing system including:

a detection unit that detects a positional relationship between a user and an object on the basis of an image captured by a camera;

a determination unit that determines a situation of the user on the basis of the positional relationship between the user and the object determined by the detection unit; and a response control unit that executes a voice response corresponding to the situation of the user determined by the determination unit.

(16)

An information processing method including:

detecting a positional relationship between a user and an object on the basis of an image captured by a camera;

determining a situation of the user on the basis of the positional relationship between the user and the object detected; and executing a voice response corresponding to the situation of the user determined.

(17)

An information processing program that causes an information processing apparatus to execute:

detection processing that detects a positional relationship between a user and an object on the basis of an image captured by a camera;

determination processing that determines a situation of the user on the basis of the positional relationship between the user and the object detected by the detection processing; and response control processing that executes a voice response corresponding to the situation of the user determined by the determination processing.

Note that the information processing apparatus of (10) described above can also be used as one having the following configuration by extracting only the following parts.

(18)

An information processing apparatus including:

a detection unit that detects a user on the basis of an image captured by a camera;

a measurement unit that measures a distance to the user detected by the detection unit; and a response control unit that executes a voice response in a case where the distance to the user measured by the measurement unit and a sound pressure of a sound signal collected by the microphone satisfy a predetermined condition.

Furthermore, the configuration of (18) can be implemented in any mode of an information processing system, an information processing method, or an information processing program.

REFERENCE SIGNS LIST 1 (1a to 1c) Information processing apparatus
3 Router
4 Access point
5 Information processing server
11 Control unit
12 Operation unit
13 Camera
14 Communication unit
15 Touch panel display unit
16 Speaker
17 Microphone
18 (18a, 18b) Array microphone
19 3D camera
111 Voice recognition unit
112 Detection unit
113 Response determination unit
114 Voice response unit
115 Direction estimation unit
116 Sound pressure determination unit
117 Setting unit

The invention claimed is:

1. An information processing apparatus, comprising:
a central processing unit (CPU) configured to:
detect a positional relationship between a user and an object based on an image captured by a camera;
determine a situation of the user based on the positional relationship between the user and the object;
execute a voice response corresponding to the situation of the user; and
control, based on the situation of the user, at least one of a type of a voice associated with the voice response or a sound quality of the voice.

2. The information processing apparatus according to claim 1, wherein the CPU is further configured to:
detect a positional relationship between a part of the user and the object, and
determine the situation of the user based on the positional relationship between the part of the user and the object.

3. The information processing apparatus according to claim 1, wherein the CPU is further configured to control, based on the situation of the user, at least one of whether to make the voice response, content of a response, a volume of the voice, or a speed of the voice.

4. The information processing apparatus according to claim 1, wherein the CPU is further configured to execute the voice response based on a sound signal collected by a microphone.

5. The information processing apparatus according to claim 4, wherein the microphone is an array microphone that can detect a direction of the sound signal collected.

6. The information processing apparatus according to claim 5, wherein the CPU is further configured to not execute the voice response in a case where a specific object that produces sound is positioned in the direction of the sound signal collected by the array microphone.

7. The information processing apparatus according to claim 5, wherein directivity of the array microphone is adjusted to a direction of the user.

8. The information processing apparatus according to claim 5, further comprising a plurality of array microphones, wherein
the CPU is further configured to select the array microphone from the plurality of array microphones based on the situation of the user.

9. The information processing apparatus according to claim 1, further comprising a sensor configured to measure a distance between the user and the object, wherein
the CPU is further configured to determine the situation of the user based on the positional relationship between the user and the object including the distance between the user and the object.

10. The information processing apparatus according to claim 1, further comprising a sensor configured to measure a distance to the user, wherein
the CPU is further configured to execute the voice response in a case where the distance to the user measured by the sensor and a sound pressure of a sound signal collected by a microphone satisfy a specific condition.

11. The information processing apparatus according to claim 1, further comprising display screen configured to display at least one of a fact that a response is in progress, a reason for not responding, or a situation of a room.

12. The information processing apparatus according to claim 1, wherein the CPU is further configured to determine the situation of the user based on an invalid word.

13. The information processing apparatus according to claim 1, wherein the situation of the user includes at least one of a state of the user or an action of the user.

14. The information processing apparatus according to claim 13, wherein the situation of the user includes at least one of a sleeping situation, a relaxing situation, a situation of watching television, or a situation of having a conversation with a family member.

15. An information processing system, comprising:
a central processing unit (CPU) configured to:
detect a positional relationship between a user and an object based on an image captured by a camera;
determine a situation of the user based on the positional relationship between the user and the object;
execute a voice response corresponding to the situation of the user; and
control, based on the situation of the user, at least one of a type of a voice associated with the voice response or a sound quality of the voice.

16. An information processing method, comprising:
detecting a positional relationship between a user and an object based on an image captured by a camera;
determining a situation of the user based on the positional relationship between the user and the object;
executing a voice response corresponding to the situation of the user; and
controlling, based on the situation of the user, at least one of a type of a voice associated with the voice response or a sound quality of the voice.

17. A non-transitory computer-readable medium having stored thereon, computer-executable instructions which, when executed by a processor, cause the processor to execute operations, the operations comprising:
detecting a positional relationship between a user and an object based on an image captured by a camera;
determining a situation of the user based on the positional relationship between the user and the object;
executing a voice response corresponding to the situation of the user; and
controlling, based on the situation of the user, at least one of a type of a voice associated with the voice response or a sound quality of the voice.

* * * * *